United States Patent
Mauro et al.

(10) Patent No.: US 12,486,194 B2
(45) Date of Patent: *Dec. 2, 2025

(54) COLORED ALKALI ALUMINOSILICATE GLASS ARTICLES

(71) Applicant: CORNING INCORPORATED, Corning, NY (US)

(72) Inventors: John Christopher Mauro, Boalsburg, PA (US); Marcel Potuzak, Rejstejn (CZ)

(73) Assignee: CORNING INCORPORATED, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/420,987

(22) Filed: Jan. 24, 2024

(65) Prior Publication Data

US 2024/0199470 A1 Jun. 20, 2024

Related U.S. Application Data

(60) Continuation of application No. 17/971,721, filed on Oct. 24, 2022, now Pat. No. 11,912,620, which is a
(Continued)

(51) Int. Cl.
*C03C 4/02* (2006.01)
*C03C 3/087* (2006.01)
(Continued)

(52) U.S. Cl.
CPC ............... *C03C 4/02* (2013.01); *C03C 3/087* (2013.01); *C03C 3/11* (2013.01); *C03C 21/002* (2013.01); *Y10T 428/315* (2015.01)

(58) Field of Classification Search
None
See application file for complete search history.

(56) References Cited

U.S. PATENT DOCUMENTS 2,049,765 A 8/1936 Fischer
2,075,446 A 3/1937 Leibig
(Continued)

FOREIGN PATENT DOCUMENTS

CN 1471127 A 1/2004
CN 101522584 A 9/2009
(Continued)

OTHER PUBLICATIONS

W. A. Weyl, A.G. Pincus, A. E. Badger, "Vanadium as a Glass Colorant," J. Am. Ceram. Soc., 22, 374-377 (1939).
(Continued)

*Primary Examiner* — David Sample
(74) *Attorney, Agent, or Firm* — Travis B. Gasa; Russel S. Magaziner; Kapil Banakar

(57) ABSTRACT

A glass article including at least about 40 mol % $SiO_2$ and, optionally, a colorant imparting a preselected color is disclosed. In general, the glass includes, in mol %, from about 40-70 $SiO_2$, 0-25 $Al_2O_3$, 0-10 $B_2O_3$; 5-35 $Na_2O$, 0-2.5 $K_2O$, 0-8.5 MgO, 0-2 ZnO, 0-10% $P_2O_5$ and 0-1.5 CaO. As a result of ion exchange, the glass includes a compressive stress ($\sigma_s$) at at least one surface and, optionally, a color. In one method, communicating a colored glass with an ion exchange bath imparts $\sigma_s$ while in another; communicating imparts $\sigma_s$ and a preselected color. In the former, a colorant is part of the glass batch while in the latter; it is part of the bath. In each, the colorant includes one or more metal containing dopants formulated to impart to a preselected color. Examples of one or more metal containing dopants include one or more transition and/or rare earth metals.

14 Claims, 12 Drawing Sheets

Related U.S. Application Data continuation of application No. 17/866,605, filed on Jul. 18, 2022, now Pat. No. 11,851,369, which is a division of application No. 16/180,563, filed on Nov. 5, 2018, now Pat. No. 11,420,899, which is a division of application No. 13/684,632, filed on Nov. 26, 2012, now abandoned.

(60) Provisional application No. 61/565,196, filed on Nov. 30, 2011.

(51) Int. Cl.
*C03C 3/11* (2006.01)
*C03C 21/00* (2006.01)

(56) References Cited

U.S. PATENT DOCUMENTS

| | | | |
|---|---|---|---|
| 2,515,943 | A | 7/1950 | Stanley et al. |
| 2,732,298 | A | 1/1956 | Stookey |
| 2,776,900 | A | 1/1957 | Duncan et al. |
| 2,779,136 | A | 1/1957 | Hood et al. |
| 3,161,528 | A | 12/1964 | Eppler |
| 3,218,220 | A | 11/1965 | Weber |
| 3,357,879 | A | 12/1967 | Bennett |
| 3,433,611 | A | 3/1969 | Saunders et al. |
| 3,498,773 | A | 3/1970 | Grubb et al. |
| 3,775,154 | A | 11/1973 | Grego et al. |
| 3,788,865 | A | 1/1974 | Busdiecker et al. |
| 3,790,260 | A | 2/1974 | Boyd et al. |
| 3,790,430 | A | 2/1974 | Mochel |
| 3,844,754 | A | 10/1974 | Grubb et al. |
| 3,859,103 | A | 1/1975 | Yoshiyagawa et al. |
| 4,015,045 | A | 3/1977 | Rinehart |
| 4,018,965 | A | 4/1977 | Kerko et al. |
| 4,038,090 | A | 7/1977 | Georg et al. |
| 4,059,454 | A | 11/1977 | Reade |
| 4,065,283 | A | 12/1977 | Asahara et al. |
| 4,108,621 | A | 8/1978 | Asahara et al. |
| 4,119,760 | A | 10/1978 | Rinehart |
| 4,130,437 | A | 12/1978 | Mazeau et al. |
| 4,211,758 | A | 7/1980 | Buhrer |
| 4,290,794 | A | 9/1981 | Wedding |
| 4,390,635 | A | 6/1983 | Morgan |
| 4,396,720 | A | 8/1983 | Beall et al. |
| 4,456,337 | A | 6/1984 | Nicholson |
| 4,567,104 | A | 1/1986 | Wu |
| 5,039,912 | A | 8/1991 | Van et al. |
| 5,190,896 | A | 3/1993 | Pucilowski et al. |
| 5,204,293 | A | 4/1993 | Amundson et al. |
| 5,236,495 | A | 8/1993 | Manabe et al. |
| 5,588,978 | A | 12/1996 | Argent et al. |
| 5,650,365 | A | 7/1997 | Higby et al. |
| 5,928,793 | A | 7/1999 | Kimura |
| 5,994,246 | A | 11/1999 | Denry |
| 6,004,391 | A | 12/1999 | Letschert et al. |
| 6,130,511 | A | 10/2000 | Rothwell et al. |
| 6,154,598 | A | 11/2000 | Gavrilovic et al. |
| 6,251,812 | B1 | 6/2001 | Koyama et al. |
| 6,287,993 | B1 | 9/2001 | Fu et al. |
| 6,333,285 | B1 | 12/2001 | Chopinet et al. |
| 6,413,892 | B1 | 7/2002 | Koyama et al. |
| 6,436,858 | B1 | 8/2002 | Laborde et al. |
| 6,518,211 | B1 | 2/2003 | Bradshaw et al. |
| 8,187,987 | B2 | 5/2012 | Amin et al. |
| 9,718,725 | B2 | 8/2017 | Ellison et al. |
| 11,912,620 | B2 * | 2/2024 | Mauro ............... C03C 21/002 |
| 2001/0049327 | A1 | 12/2001 | Hachitani |
| 2002/0042338 | A1 | 4/2002 | Oyama et al. |
| 2003/0000251 | A1 | 1/2003 | Tan et al. |
| 2003/0155854 | A1 | 8/2003 | Sugawara et al. |
| 2003/0183991 | A1 | 10/2003 | Hideki et al. |
| 2004/0041514 | A1 | 3/2004 | Sugawara et al. |
| 2005/0054509 | A1 | 3/2005 | Hoen et al. |
| 2005/0096210 | A1 | 5/2005 | Kawai |
| 2005/0245385 | A1 | 11/2005 | Landa et al. |
| 2005/0250639 | A1 | 11/2005 | Siebers et al. |
| 2006/0063009 | A1 | 3/2006 | Naitou et al. |
| 2009/0197088 | A1 | 8/2009 | Murata |
| 2009/0215607 | A1 | 8/2009 | Dejneka et al. |
| 2010/0009154 | A1 | 1/2010 | Allan et al. |
| 2010/0035745 | A1 | 2/2010 | Murata |
| 2010/0047521 | A1 | 2/2010 | Amin et al. |
| 2010/0291353 | A1 | 11/2010 | Dejneka et al. |
| 2011/0071012 | A1 | 3/2011 | Kondo et al. |
| 2012/0208692 | A1 | 8/2012 | Munch et al. |
| 2012/0270016 | A1 | 10/2012 | Hashimoto et al. |
| 2013/0136909 | A1 | 5/2013 | Mauro et al. |
| 2013/0288001 | A1 | 10/2013 | Murata et al. |
| 2013/0316162 | A1 | 11/2013 | Murata et al. |
| 2014/0099501 | A1 * | 4/2014 | Yamamoto ............... C03C 3/083 428/335 |
| 2014/0113141 | A1 | 4/2014 | Yamamoto et al. |
| 2014/0141217 | A1 | 5/2014 | Gulati et al. |
| 2014/0154661 | A1 | 6/2014 | Bookbinder et al. |
| 2017/0345699 | A1 | 11/2017 | Katayama |
| 2020/0377404 | A1 | 12/2020 | Beall et al. |

FOREIGN PATENT DOCUMENTS

| | | | |
|---|---|---|---|
| CN | 102020418 | A | 4/2011 |
| CN | 102123960 | A | 7/2011 |
| DE | 2006078 | B1 | 2/1971 |
| GB | 0714940 | A | 9/1954 |
| GB | 1320466 | A | 6/1973 |
| GB | 2017675 | A | 10/1979 |
| JP | 47-004191 | | 2/1972 |
| JP | 48-001809 | | 1/1973 |
| JP | 58-185452 | A | 10/1983 |
| JP | 01-239036 | A | 9/1989 |
| JP | 11-302032 | A | 11/1999 |
| JP | 2000-516903 | A | 12/2000 |
| JP | 2000-576903 | A | 12/2000 |
| JP | 2002-260216 | A | 9/2002 |
| JP | 2004-206741 | A | 7/2004 |
| JP | 2008-195602 | A | 8/2008 |
| JP | 2011-084456 | A | 4/2011 |
| JP | 2012-500177 | A | 1/2012 |
| TW | 201127771 | A | 8/2011 |
| WO | 2012/124758 | A1 | 9/2012 |
| WO | 2012/124774 | A1 | 9/2012 |
| WO | WO-2012124757 | A1 * | 9/2012 ........... C03C 21/002 |

OTHER PUBLICATIONS

ASTM standard C770-98 (2008), entitled "Standard Test Method for Measurement of Glass Stress-Optical Coefficient."

Chinese Patent Application No. 201910355151.1, Office Action dated May 26, 2021, 13 pages (8 pages of English Translation and 5 pages of Original Document), Chinese Patent Office.

English Translation of CN201280068397.7 First Office Action and Search Report Dated Mar. 21, 2016.

English Translation of CN201280068397.7 Search Report Dated Mar. 21, 2016.

English Translation of JP2014544863 Office Action Dated Nov. 22, 2016, Japan Patent Office.

European Patent Application No. 12805840.1, Office Action a European Patent dated Jun. 24, 2019; 13 pages; European Patent Office.

European Patent Application No. 12805840.1, Office Action a European Patent dated Nov. 30, 2017; 6 pages; European Patent Office.

FSM-30 Surface Stress Meter Brochure, Cat No. FS-0013E at http://www.orihara-ss.co.jp/catalog/fsm/fsm-30-Ecat.pdf.

FSM-60 Surface Stress Meter Brochure, Cat No. FS-0013E at http://www.luceo.co.jp/english/pdf/FSM:60LE%20Ecat.pdf.

FSM-6000LE Surface Stress Meter Brochure, http://www.luceo.co.jp/english/pdf/FSM-6000LE%20Ecat.pdf.

FSM-60LE Surface Stress Meter Brochure, Cat No. FS-0013E at http://www.luceo.co.jp/english/pdf/FSM-60LE%20Ecat.pdf.

(56) References Cited

OTHER PUBLICATIONS

FSM-7000H Surface Stress Meter Brochure, Cat http://www.luceo.co.jp/catalog/catalog-pdf/FSM-7000H_cat.pdf.

FSM-7000H Surface Stress Meter Brochure, Cat No. FS-0024 Aug. 2009 at http://www.luceo.co.jp/catalog/catalog-pdf/FSM-7000H_cat.pdf.

G. J. Janz et al., "Molten Salts Data: Diffusion Coefficients in Single and Multi-Component Salt Systems," J. Phys. Chem. Ref. Data, vol. 11, No. 3, pp. 505-693 (1982) at http://www.nist.gov/data/PDFfiles/ipcrd204.pdf.

G. J. Janz et al., "Molten Salts: vol. 1, Electrical Conductance, Density, and Viscosity Data," Nat. Stand. Ref. Data Ser., NBS (US) 15, 139 pages (Oct. 1968) at http://www.nist.gov/data/nsrds/NSRDS-NBS-15.pdf.

G. J. Janz et al., "Molten Salts: vol. 2, Section 2, Surface Tension Data," Nat. Stand. Ref. Data Ser., NBS (U.S.) 28, 62 pages (Aug. 1969) at http://www.nist.gov/data/nsrds/NSRDS-NBS-28.pdf.

G. J. Janz et al., "Molten Salts: vol. 3, Nitrates, Nitrites and Mixtures, Electrical Conductance, Density, Viscosity and Surface Tension Data," J. Phys. Chem. Ref. Data, vol. 1, No. 3, pp. 581-746 (1972) at http://www.nist.gov/data/PDFfiles/jpcrd10.pdf.

G. J. Janz et al., "Molten Salts: vol. 4, Part 1, Fluorides and Mixtures, Electrical Conductance, Density, Viscosity and Surface Tension Data," J. Phys. Chem. Ref. Data, vol. 3, No. 1, pp. 1-116 (1974) at http://www.nist.gov/data/PDFfiles/jpcrd41.pdf.

G. J. Janz et al., "Molten Salts: vol. 4, Part 2, Chlorides and Mixtures, Electrical Conductance, Density, Viscosity and Surface Tension Data," J. Phys. Chem. Ref. Data, vol. 4, No. 4, pp. 871-1178 (1975) at http://www.nist.gov/data/PDFfiles/jpcrd71.pdf.

G. J. Janz et al., "Molten Salts: vol. 4, Part 2, Chlorides and Mixtures, Electrical Conductance, Density, Viscosity and Surface Tension Data," J. Phys. Chem. Ref. Data, vol. 4, No. 4, pp. 871-1178 (1975) at http://www.nist.gov/data/PDFfiles/jgcrd71.pdf.

G. J. Janz et al., "Molten Salts: vol. 4, Part 3, Bromides and Mixtures, Iodides and Mixtures," J. Phys. Chem. Ref. Data, vol. 6, No. 2, pp. 409-596 (1977) at http://www.nist.gov/data/PDFfiles/jpcrd96.pdf.

G. J. Janz et al., "Molten Salts: vol. 4, Part 4, Mixed Halide Melts, Electrical Conductance, Density, Viscosity and Surface Tension Data," J. Phys. Chem. Ref. Data, vol. 8, pp. 125-302 (1979) at http://www.nist.gov/data/PDFfiles/jpcrd135.pdf.

G. J. Janz et al., "Molten Salts: vol. 5, Part 2, Additional Systems with Common Anions; Electrical Conductance, Density, Viscosity, and Surface Tension Data," J. Phys. Chem. Ref. Data. vol. 12, No. 3, pp. (1983) at http://www.nist.gov/data/PDFfiles/jpcrd230.pdf.

G. J. Janz et al., "Molten Salts: Volwne 5, Part 1, Additional Systems with Common Anions; Electrical Conductance, Density, Viscosity, and Surface Tension Data," J. Phys. Chem. Ref. Data. vol. 9, No. 4, pp. 831-1020 (1980) at http://www.nist.gov/data/PDFfiles/jpcrd168.pdf.

G. J. Janz et al., "Physical Properties Data Compilations Relevant to Energy Storage. II. Molten Salts: Data on Single and Multi-Component Systems," NSRDS. NBS 61, Part II, U.S. Gov't Printing Office, Washington, DC (1979) at http://www.nist.gov/data/nsrds/NSRDS-NBS61-II.pdf.

G. J. Janz et al., "Physical Properties Data Compilations Relevant to Energy Storage: I. Molten Salts: Eutectic Data," NSRDS. NBS 61, Part I, U.S. Gov't Printing Office, Washington, DC (1978) at http://www.nist.gov/data/nsrds/NSRDS-NBS-61-1.pdf.

H. Nagano, M. Misonou, and H. Kawahara, "Mechanism of Coloration in Copper-Stained Float Glass," J. Non-Cryst. Solids, 120, 199-206 (1990).

H. Rawson, "The Calculation of Transmission Curves of Glass Stained by Copper and Silver Compounds," Phys. Chem. Glasses, 6, 81-84 (1965).

International Search Report and Written Opinion of the International Searching Authority; PCT/US2012/066960; Mailed Jul. 10, 2013; 15 Pages.

Janz et al., "Molten Salts: vol. 5, Part 2, Additional Systems with Common Anions; Electrical Conductance, Density, Viscosity, and Surface Tension Data," J. Phys. Chem. Ref. Data. vol. 9, No. 4, pp. 831-1020 (1980) at http://www.nist.gov/data/PDFfiles/jpcrd168.pdf.

K. H. Stem, "High Temperature Properties and Decomposition of Inorganic Salts," J. Phys. Chem. Ref. Data, vol. 3, No. 2, pp. 48-526 (1974) at http://www.nist.gov/data/PDFfiles/jpcrd51.pdf.

K. Kobayashi et al., "Chemical Strengthening of Glass and Industrial Application," [52 (1977)], pp. 109-112 at http://www.orihara-ss_co.jp/data/literature01/A001.pdf.

S. Sakka, K. Kamiya, and K. Kato, "Incorporation of Copper into Glass by the Cu→Na Ion Exchange," J. Non-Cryst. Solids 52, 77-90 (1982).

T. Kishii, "Surface Stress Meters Utilizing the Optical Waveguide Effect of Chemically Tempered Glasses," Optics & Lasers in Engineering 4 (1983) pp. 25-38 at http://www.orihara-ss.co.jp/data/literature01/A034.pdf.

Wang et al., "Glass Surface Decoration" In National Defense Industry Press, Edition 2, 2011, 21 pages (13 pages of English Translation and 8 pages of Original Document).

XP001708881, "Chemical Abstracts—Applied Chemistry and Chemical-Engineering Sections", vol. 79, No. 10, Nov. 19, 1973, 1 page.

Zengtian: "Commodity Science"; pp. 192-194, Peking University Press, Aug. 2010.

* cited by examiner

| Color Imparting Dopant | As-Made | IOX | | |
|---|---|---|---|---|
| | | 2 [h] at 450°C | 32 [h] at 410°C | 64 [h] at 410°C |
| Cu | | | | |
| Fe | | | | |
| V | | | | |
| Cr | | | | |
| Co | | | | |
| Au | | | | |

FIG. 1

COLORED ALKALI ALUMINOSILICATE GLASS ARTICLES

PRIORITY APPLICATIONS

This application is a continuation of U.S. patent application Ser. No. 17/971,721, filed on Oct. 24, 2022, which is a continuation of U.S. patent application Ser. No. 17/866,605, filed on Jul. 18, 2022 which issued Dec. 26, 2023 as U.S. Pat. No. 11,851,369, which is a divisional of U.S. patent application Ser. No. 16/180,563, filed on Nov. 5, 2018 which issued Aug. 23, 2022 as U.S. Pat. No. 11,420,899, which is a divisional of U.S. patent application Ser. No. 13/684,632, filed on Nov. 26, 2012, which claims the benefit of priority to 61/565,196, filed on Nov. 30, 2011, the content of which is relied upon and incorporated herein by reference in entirety.

BACKGROUND

Field

Aspects of embodiments and/or embodiments of this disclosure generally relate to the field of glass materials technology and more specifically to the field of alkali aluminosilicate glass materials technology. Also, aspects of embodiments and/or embodiments of this disclosure are directed to one or more of: an ion exchangeable colored glass composition that substantially maintains its original color following an ion exchange treatment; an ion exchangeable, colorable glass composition to which a preselected color can be imparted by an ion exchange treatment; an ion exchanged (IOX) colored glass composition; an article or machine or equipment of or including an IOX colored glass composition; and one or more processes for making an IOX colored glass composition.

Technical Background

Glass articles are commonly utilized in a variety of consumer and commercial applications such as electronic applications, automotive applications, and even architectural applications. For example, consumer electronic devices, such as mobile phones, computer monitors, GPS devices, televisions and the like, commonly incorporate glass substrates as part of a display. In some of these devices, the glass substrate is also utilized to enable touch functionality, such as when the displays are touch screens. As many of these devices are portable, it can be desirable that the glass articles incorporated in such devices be sufficiently robust to tolerate impact and/or damage, such as scratches and the like, during both use and transport.

Corning GORILLA® glass, a clear alkali aluminosilicate glass, has been a successful product due to its ability to achieve high strength and damage resistance. To date, this alkali aluminosilicate glass has been primarily used for applications that require transmission of visible light. However, new potential applications relating to product color(s) and/or aesthetics as not addressed by clear alkali aluminosilicate glasses.

The problem(s) of attaining product color(s) and/or aesthetics are solved by one or more ion exchangeable colored glass compositions that substantially maintain their original color following an ion exchange treatment (IOX); one or more ion exchangeable, colorable glass compositions to which one or more preselected colors can be imparted by an ion exchange treatment (IOX); one or more ion exchanged (IOX) colored glass compositions; and one or more processes for making one or more IOX colored glass compositions. Such one or more ion exchangeable colored glass compositions and/or one or more ion exchangeable, colorable glass compositions can combine the ion exchangeability characteristics of GORILLA® glass with the depth and breadth colors found in stained art glass. In aspects, such one or more ion exchangeable colored glass compositions exhibit colorfastness following an ion exchange treatment (IOX). Also, such one or more IOX colored glass compositions combine the high strength and damage resistance of GORILLA® glass with the depth and breadth colors found in stained art glass. To that end, the forgoing one or more glass compositions might be utilized and/or incorporated, for example, in personal electronic devices as an underside or backplates and/or household appliances as protective shells/casings.

Additionally, the problem(s) of attaining product color(s) and/or aesthetics on an industrial scale are solved by the forgoing one or more glass compositions being compatible with large-scale sheet glass manufacturing methods, such as down-draw processes and slot-draw processes that are commonly used today in the manufacture thin glass substrates, for example, for incorporation into electronic devices.

SUMMARY

Some aspects of embodiments and/or embodiments of this disclosure relate to one or more ion exchangeable colored glass compositions that substantially maintain their original color following an ion exchange treatment (IOX); one or more ion exchangeable, colorable glass compositions to which one or more preselected colors can be imparted by an ion exchange treatment (IOX); one or more IOX colored glass compositions; and one or more processes for making one or more IOX colored glass compositions.

As to some aspects relating to compositions, such one or more ion exchangeable colored glass compositions and/or such one or more ion exchangeable, colorable glass compositions and/or such one or more IOX colored glass compositions included at least about 40 mol % $SiO_2$. As to other aspects, such one or more ion exchangeable colored glass compositions and/or such one or more IOX colored glass compositions include one or more metal containing dopants formulated to impart a preselected color (e.g., any one or more of any of preselected hue {e.g., shades of red, orange, yellow, green, blue, and violet}, preselected saturation, preselected brightness, and/or preselected gloss).

As to other aspects, such one or more ion exchangeable colored glass compositions and/or such one or more ion exchangeable, colorable glass compositions are formulated so that, following an ion exchange treatment (IOX), for example, up to about 64 hours, the IOX colored glass has at least one surface under a compressive stress ($\sigma_s$) of at least about 500 MPa and a depth of layer (DOL) of at least about 15 m.

As to aspects relating to one or more ion exchangeable colored glass compositions, such compositions are formulated so that, following an ion exchange treatment (IOX) up to about 64 hours, the color substantially retains its original hue without fading or running (e.g., is substantially color fast). In aspects relating to substantial color retention, a color difference in the CIELAB color space coordinates of a preselected color of such one or more ion exchangeable glass compositions after an IOX treatment and before the IOX treatment may be characterized by $\Delta E = [\{\Delta L^*\}^2 +$ $\{\Delta a^*\}^2 + \{\Delta b^*\}^2]^{0.5}$ determined from specular transmittance measurements using a spectrophotometer.

Returning to aspects relating to compositions, such one or more ion exchangeable colored glass compositions and/or such one or more ion exchangeable, colorable glass compositions and/or such one or more IOX colored glass compositions also might include $SiO_2$ from about 40 mol % to about 70 mol %; $Al_2O_3$ comprises from about 0 mol % to about 25 mol %; $B_2O_3$ comprises from 0 mol % to about 10 mol %; $Na_2O$ comprises from about 5 mol % to about 35 mol %; $K_2O$ comprises from 0 mol % to about 2.5 mol %; MgO comprises from 0 mol % to about 8.5 mol %; ZnO comprises from 0 mol % to about 2 mol %; $P_2O_5$ comprises from about 0 to about 10%; CaO comprises from 0 mol % to about 1.5 mol %; $Rb_2O$ comprises from 0 mol % to about 20 mol %; and $Cs_2O$ comprises from 0 mol % to about 20 mol %. It will be appreciated that one of more sub-ranges of any one or more of the preceding are contemplated.

Other aspects of embodiments and/or embodiments of this disclosure relate to a method of making a colored glass article having at least one surface under a compressive stress ($\sigma_s$) and a depth of layer (DOL) and a preselected colored. Such method can include communicating at least one surface of an aluminosilicate glass article, which has $SiO_2$ at least about 40 mol %, and a bath including one or more metal containing dopant sources and in amounts formulated to impart a preselected color to the aluminosilicate glass article by an ion exchange treatment of the aluminosilicate glass article at a temperature, for example, between about 350° C. and about 500° C. for a sufficient time up to about 64 hours to impart the compressive stress ($\sigma_s$), the depth of layer (DOL), and the preselected color at the at least one surface of the aluminosilicate glass. It will be appreciated, that in some other aspects, the compressive stress ($\sigma_s$) might be at least about 500 MPa while the depth of layer (DOL) might at least about 15 m. In aspects, a bath is formulated using one or more salts including one or more strengthening ion sources, such as, for example, a potassium source; the one or more metal containing dopant sources; and a melting temperature less than or equal to the ion exchange treatment temperature. In other aspects, the one or more salts might be a formulation of one or more of a metal halide, cyanide, carbonate, chromate, a nitrogen oxide radical, manganate, molybdate, chlorate, sulfide, sulfite, sulfate, vanadyl, vanadate, tungstate, and combinations of two or more of the proceeding, alternatively, a formulation of one or more of a metal halide, carbonate, chromate, a nitrate, manganate, sulfide, sulfite, sulfate, vanadyl, vanadate, and combinations of two or more of the proceeding.

In any aspects relating to one or more ion exchangeable colored glass compositions that substantially maintain their original color following an IOX; one or more ion exchangeable, colorable glass compositions to which one or more preselected colors can be imparted by an IOX; one or more IOX colored glass compositions; and/or one or more processes for making one or more IOX colored glass compositions, an ion exchange treatment (IOX) might be performed at between about 350° C. and 500° C. and/or between about 1 hour and 64 hours.

Also in any aspects relating to such one or more ion exchangeable colored glass compositions and/or such one or more ion exchangeable, colorable glass compositions and/or such one or more IOX colored glass compositions, a glass article having a thickness of up to about 1 mm or more might be made using such compositions.

In any aspects relating to one or more ion exchangeable colored glass compositions that substantially maintain their original color following an IOX; one or more ion exchangeable, colorable glass compositions to which one or more preselected colors can be imparted by an IOX; one or more IOX colored glass compositions; and/or one or more processes for making one or more IOX colored glass compositions, a colorant might include one or more metal containing dopants in amounts formulated to impart a preselected color (e.g., any one or more of any of preselected hue {e.g., shades of red, orange, yellow, green, blue, and violet}, preselected saturation, preselected brightness, and/or preselected gloss) to the glass. Such one or more metal containing dopants include, in some aspects, one or more of transition metals, one or more of rare earth metals, or one or more of transition metals and one or more of rare earth metals; in other aspects, one or more of one or more of Au, Ag, Cu, Ni, Co, Fe, Mn, Cr, V, Ti, La, Ce, Pr, Nd, Sm, Eu, Gd, Tb, Dy, Ho, Er, Tm, Yb, and Lu; in still other aspects, one or more metal containing dopants formulated to impart a preselected color comprises one or more of Au, Ag, Cu, Ni, Co, Fe, Mn, Cr, and V.

Yet other aspects of embodiments and/or embodiments of this disclosure relate to one or more methods of making one or more colorfast, ion exchangeable glass compositions as disclosed and described herein. In some aspect, the one or more methods impart the one or more glass articles with a layer under a compressive stress ($\sigma_s$) and a depth of layer (DOL), the layer extending from a surface of the glass article toward the depth of layer. The one or more methods can involve subjecting at one surface of an alkali aluminosilicate glass article to an ion exchanging bath at a temperature of up to about 500° C. for up to about 64 hours, optionally, up to about 16 hours, for a sufficient time to form the layer. In further aspects, the bath can comprise at least at least a colorant including one or more metal containing dopants formulated to impart a preselected color as disclosed and described herein.

Numerous other aspects of embodiments, embodiments, features, and advantages of this disclosure will appear from the following description and the accompanying drawings. In the description and/or the accompanying drawings, reference is made to exemplary aspects of embodiments and/or embodiments of this disclosure which can be applied individually or combined in any way with each other. Such aspects of embodiments and/or embodiments do not represent the full scope of this disclosure. Reference should therefore be made to the claims herein for interpreting the full scope of this disclosure. In the interest of brevity and conciseness, any ranges of values set forth in this specification contemplate all values within the range and are to be construed as support for claims reciting any sub-ranges having endpoints which are real number values within the specified range in question. By way of a hypothetical illustrative example, a recitation in this disclosure of a range of from about 1 to 5 shall be considered to support claims to any of the following ranges: 1-5; 1-4; 1-3; 1-2; 2-5; 2-4; 2-3; 3-5; 3-4; and 4-5. Also in the interest of brevity and conciseness, it is to be understood that such terms as "is," "are," "includes," "having," "comprises," and the like are words of convenience and are not to be construed as limiting terms and yet may encompass the terms "comprises," "consists essentially of," "consists of," and the like as is appropriate.

These and other aspects, advantages, and salient features of this disclosure will become apparent from the following description, the accompanying drawings, and the appended claims.

BRIEF DESCRIPTION OF THE DRAWINGS

The drawings referenced herein form a part of the specification. Features shown in the drawings are meant to be illustrative of some, but not all, embodiments of this disclosure, unless otherwise explicitly indicated, and implications to the contrary are otherwise not to be made. Although like reference numerals correspond to similar, though not necessarily identical, components and/or features in the drawings, for the sake of brevity, reference numerals or features having a previously described function may not necessarily be described in connection with other drawings in which such components and/or features appear.

FIG. 1 shows a matrix of photographs (which have been converted from color to black-gray-white) illustrating a retention of original hue without fading or running (e.g., colorfastness) of ion exchangeable colored glass compositions and IOX colored glass compositions made according to aspects of embodiments and/or embodiments of this disclosure;

DETAILED DESCRIPTION

Figure 2:
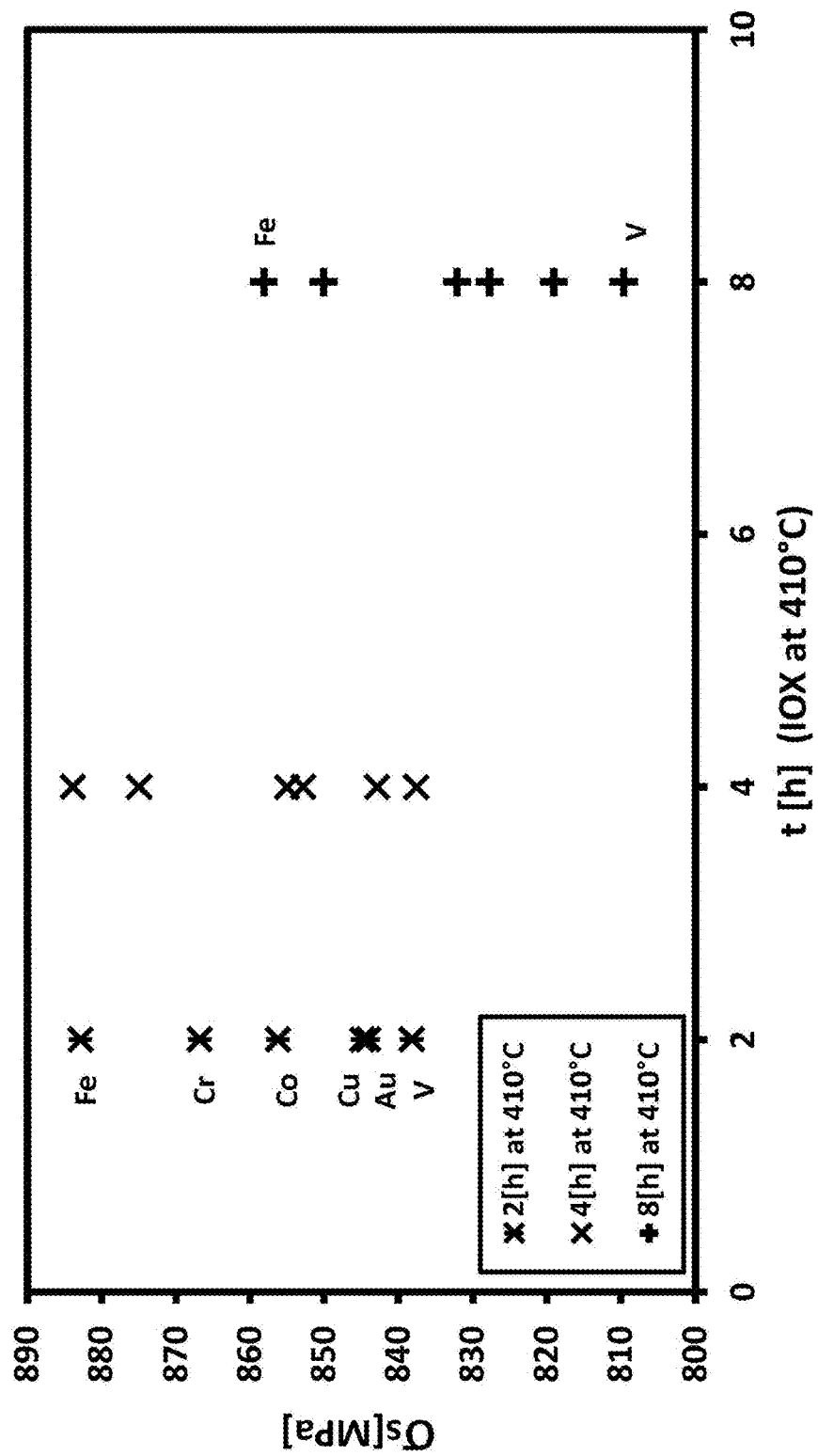
FIG. 2 shows the compressive stress ($\sigma_s$) as a function of ion exchange treatment (IOX) time (t [h]) at 410° C. for substrates of IOX colored glass compositions (i.e., Samples 1-18) according to aspects of embodiments and/or embodiments of this disclosure.

In the following description of exemplary aspects of embodiments and/or embodiments of this disclosure, reference is made to the accompanying drawings that form a part hereof, and in which are shown by way of illustration specific aspects of embodiments and/or embodiments in which this disclosure may be practiced. While these aspects of embodiments and/or embodiments are described in sufficient detail to enable those skilled in the art to practice this disclosure, it will nevertheless be understood that no limitation of the scope of this disclosure is thereby intended. Alterations and further modifications of the features illustrated herein, and additional applications of the principles illustrated herein, which would occur to one skilled in the relevant art and having possession of this disclosure, are to be considered within the scope of this disclosure. Specifically, other aspects of embodiments and/or embodiments may be utilized, logical changes (e.g., without limitation, any one or more of chemical, compositional {e.g., without limitation, any one or more of chemicals, materials, . . . and the like}, electrical, electrochemical, electromechanical, electro-optical, mechanical, optical, physical, physiochemical, . . . and the like) and other changes may be made without departing from the spirit or scope of this disclosure. Accordingly, the following description is not to be taken in a limiting sense and the scope of aspects of embodiments and/or embodiments of this disclosure are defined by the appended claims. It is also understood that terms such as "top," "bottom," "outward," "inward," . . . and the like are words of convenience and are not to be construed as limiting terms. Also, unless otherwise specified herein, a range of values includes both the upper and lower limits of the range. For example, a range of about 1-10 mol % includes the values of 1 mol % and 10 mol %.

As noted, various aspects of embodiments and/or embodiments of this disclosure relate to an article and/or machine or equipment formed from and/or including one or more IOX colored glass compositions of this disclosure. As one example, an ion exchangeable, colored glass compositions; ion exchangeable, colorable glass compositions; and/or IOX colored glass compositions might be used in a variety of electronic devices or portable computing devices, which might be configured for wireless communication, such as, computers and computer accessories, such as, "mice", keyboards, monitors (e.g., liquid crystal display (LCD), which might be any of cold cathode fluorescent lights (CCFLs-backlit LCD), light emitting diode (LED-backlit LCD) . . . etc, plasma display panel (PDP) . . . and the like), game controllers, tablets, thumb drives, external drives, whiteboards . . . etc.; personal digital assistants (PDAs); portable navigation device (PNDs); portable inventory devices (PIDs); entertainment devices and/or centers, devices and/or center accessories such as, tuners, media players (e.g., record, cassette, disc, solid-state . . . etc.), cable and/or satellite receivers, keyboards, monitors (e.g., liquid crystal display (LCD), which might be any of cold cathode fluorescent lights (CCFLs-backlit LCD), light emitting diode (LED-backlit LCD) . . . etc, plasma display panel (PDP) . . . and the like), game controllers . . . etc.; electronic reader devices or e-readers; mobile or smart phones . . . etc. As alternative examples, an ion exchangeable, colored glass compositions; ion exchangeable, colorable glass compositions; and/or IOX colored glass compositions might be used in automotive, appliances, and even architectural applications. To that end, it is desirable that such ion exchangeable, colored glass compositions and ion exchangeable, colorable glass compositions are formulated to have a sufficiently low softening point and a sufficiently low coefficient of thermal expansion so as to be compatible with to shaping into complex shapes.

As to some aspects relating to compositions, such one or more ion exchangeable colored glass compositions and/or such one or more ion exchangeable, colorable glass compositions and/or such one or more IOX colored glass compositions included at least about 40 mol % $SiO_2$. As to other aspects, such one or more ion exchangeable colored glass compositions and/or such one or more IOX colored glass compositions include one or more metal containing dopants formulated to impart a preselected color (e.g., any one or more of any of preselected hue {e.g., shades of red, orange, yellow, green, blue, and violet}, preselected saturation, preselected brightness, and/or preselected gloss).

As to aspects relating to one or more ion exchangeable colored glass compositions, such compositions are formulated so that, following an ion exchange treatment (IOX) up to about 64 hours, the color substantially retains its original hue without fading or running (e.g., is substantially color fast). In aspects relating to substantial color retention, a color difference ($\Delta E=[\{\Delta L^*\}^2+\{\Delta a^*\}^2+\{\Delta b^*\}^2]^{0.5}$) in the CIELAB color space coordinates of a preselected color of such one or more ion exchangeable glass compositions after an IOX treatment and before the IOX treatment determined from specular transmittance measurements using a spectrophotometer include:
1. up to about 8.2 when measurement results obtained between about 200 nm-2500 nm are presented in CIELAB color space coordinates for an observer angle of 10° and a CIE illuminant A; or
2. up to about 9.1 when measurement results obtained between about 200 nm-2500 nm are presented in CIELAB color space coordinates for an observer angle of 10° and a CIE illuminant F02; or
3. up to about 8.4 when measurement results obtained between about 200 nm-2500 nm are presented in CIELAB color space coordinates for an observer angle of 10° and a CIE illuminant D65; or
4. up to about 5.2 when measurement results obtained between about 360 nm-750 nm are presented in CIELAB color space coordinates for an observer angle of 10° and a CIE illuminant A; or
5. up to about 6.3 when measurement results obtained between about 360 nm-750 nm are presented in CIELAB color space coordinates for an observer angle of 10° and a CIE illuminant F02; or
6. up to about 6.5 when measurement results obtained between about 360 nm-750 nm are presented in CIELAB color space coordinates for an observer angle of 10° and a CIE illuminant D65;

alternatively, a color difference ($\Delta E=[\{\Delta L^*\}^2+\{\Delta a^*\}^2+\{\Delta b^*\}^2]^{0.5}$) in the CIELAB color space coordinates of a preselected color of such one or more ion exchangeable glass compositions after an IOX treatment and before the IOX treatment determined from specular transmittance measurements using a spectrophotometer include:
1. up to about 3.5 when measurement results obtained between about 200 nm-2500 nm are presented in CIELAB color space coordinates for an observer angle of 10° and a CIE illuminant A; or
2. up to about 3.6 when measurement results obtained between about 200 nm-2500 nm are presented in CIELAB color space coordinates for an observer angle of 10° and a CIE illuminant F02; or
3. up to about 3.3 when measurement results obtained between about 200 nm-2500 nm are presented in CIELAB color space coordinates for an observer angle of 10° and a CIE illuminant D65; or
4. up to about 5.2 when measurement results obtained between about 360 nm-750 nm are presented in CIELAB color space coordinates for an observer angle of 10° and a CIE illuminant A; or
5. up to about 6.3 when measurement results obtained between about 360 nm-750 nm are presented in CIELAB color space coordinates for an observer angle of 10° and a CIE illuminant F02; or
6. up to about 6.5 when measurement results obtained between about 360 nm-750 nm are presented in CIELAB color space coordinates for an observer angle of 10° and a CIE illuminant D65.

Returning to aspects relating to compositions, such one or more ion exchangeable colored glass compositions and/or such one or more ion exchangeable, colorable glass compositions and/or such one or more IOX colored glass compositions might include $Al_2O_3$; at least one alkali metal oxide of the form $R_2O$, wherein R comprises one or more of Li, Na, K, Rb, and Cs; and one or more of $B_2O_3$, $K_2O$, MgO, ZnO, and $P_2O_5$. In some other aspects, such one or more ion exchangeable colored glass compositions and/or such one or more ion exchangeable, colorable glass compositions and/or such one or more IOX colored glass compositions also might include $SiO_2$ from about 40 mol % to about 70 mol %; $Al_2O_3$ comprises from about 0 mol % to about 25 mol %; $B_2O_3$ comprises from 0 mol % to about 10 mol %; $Na_2O$ comprises from about 5 mol % to about 35 mol %; $K_2O$ comprises from 0 mol % to about 2.5 mol %; MgO comprises from 0 mol % to about 8.5 mol %; ZnO comprises from 0 mol % to about 2 mol %; $P_2O_5$ comprises from about 0 to about 10%; CaO comprises from 0 mol % to about 1.5 mol %; $Rb_2O$ comprises from 0 mol % to about 20 mol %; and $Cs_2O$ comprises from 0 mol % to about 20 mol %. It will be appreciated that one of more sub-ranges of any one or more of the preceding are contemplated. In further aspects, in such one or more ion exchangeable colored glass compositions and/or such one or more ion exchangeable, colorable glass compositions and/or such one or more IOX colored glass compositions a sum of the mol % of $R_2O+Al_2O_3+MgO+ZnO$ might be at least about 25 mol %. In still further aspects, such one or more ion exchangeable colored glass compositions and/or such one or more ion exchangeable, colorable glass compositions and/or such one or more IOX colored glass compositions might include at least one fining agent of one or more of F, Cl, Br, I, $As_2O_3$, $Sb_2O_3$, $CeO_2$, $SnO_2$, and combinations thereof.

In any aspects relating to one or more ion exchangeable colored glass compositions that substantially maintain their original color following an IOX; one or more ion exchangeable, colorable glass compositions to which one or more preselected colors (e.g., any one or more of any of preselected hue {e.g., shades of red, orange, yellow, green, blue, and violet}, preselected saturation, preselected brightness, and/or preselected gloss) can be imparted by an IOX; one or more IOX colored glass compositions; and/or one or more processes for making one or more IOX colored glass compositions. a colorant might include one or more metal containing dopants in amounts formulated to impart a preselected color (e.g., any one or more of preselected hue {e.g., shades of red, orange, yellow, green, blue, and violet}, preselected saturation, preselected brightness, and/or preselected gloss) to the glass. Such one or more metal containing dopants include, in some aspects, one or more of transition metals, one or more of rare earth metals, or one or more of transition metals and one or more of rare earth metals; in other aspects, one or more of one or more of Au, Ag, Cu, Ni, Co, Fe, Mn, Cr, V, Ti, La, Ce, Pr, Nd, Sm, Eu, Gd, Tb, Dy, Ho, Er, Tm, Yb, and Lu; in still other aspects, one or more metal containing dopants formulated to impart a preselected color comprises one or more of Au, Ag, Cu, Ni, Co, Fe, Mn, Cr, and V.

Other aspects of embodiments and/or embodiments of this disclosure relate to a method of making a colored glass article having at least one surface under a compressive stress ($\sigma_s$) and a depth of layer (DOL) and a preselected colored. Such method can include communicating at least one surface of an aluminosilicate glass article, which has $SiO_2$ at least about 40 mol %, and a bath including one or more metal containing dopant sources and in amounts formulated to impart a preselected color to the aluminosilicate glass article by an ion exchange treatment of the aluminosilicate glass article at a temperature, for example, between about 350° C. and about 500° C. for a sufficient time up to about 64 hours to impart the compressive stress ($\sigma_s$), the depth of layer (DOL), and the preselected color at the at least one surface of the aluminosilicate glass. It will be appreciated, that in some other aspects, the compressive stress ($\sigma_s$) might be at least about 500 MPa while the depth of layer (DOL) might at least about 15 m. In aspects, a bath is formulated using one or more salts including one or more strengthening ion sources, such for example, a potassium source; the one or more metal containing dopant sources; and a melting temperature less than or equal to the ion exchange treatment temperature. In other aspects, the one or more metal containing dopants sources comprises one or more of one or more of Au, Ag, Cu, Ni, Co, Fe, Mn, Cr, V, Ti, La, Ce, Pr, Nd, Sm, Eu, Gd, Tb, Dy, Ho, Er, Tm, Yb, and Lu, alternately, one or more of one or more of Au, Ag, Cu, Ni, Co, Fe, Mn, Cr, and V. In still other aspects, the one or more salts might be a formulation of one or more of a metal halide, cyanide, carbonate, chromate, a nitrogen oxide radical, manganate, molybdate, chlorate, sulfide, sulfite, sulfate, vanadyl, vanadate, tungstate, and combinations of two or more of the proceeding, alternatively, a formulation of one or more of a metal halide, carbonate, chromate, a nitrate, manganate, sulfide, sulfite, sulfate, vanadyl, vanadate, and combinations of two or more of the proceeding.

Yet other aspects of embodiments and/or embodiments of this disclosure relate to one or more methods of making one or more colorfast, ion exchangeable glass compositions as disclosed and described herein. In some aspect, the one or more methods impart the one or more glass articles with a layer under a compressive stress ($\sigma_s$) and a depth of layer (DOL), the layer extending from a surface of the glass article toward the depth of layer. The one or more methods can involve subjecting at one surface of an alkali aluminosilicate glass article to an ion exchanging bath at a temperature of up to about 500° C. for up to about 64 hours, optionally, up to about 16 hours, for a sufficient time to form the layer. In further aspects, the bath can comprise at least at least a colorant including one or more metal containing dopants formulated to impart a preselected color as disclosed and described herein.

As to other aspects, such one or more ion exchangeable colored glass compositions and/or such one or more ion exchangeable, colorable glass compositions are formulated so that, following an ion exchange treatment (IOX), for example, up to about 64 hours, the IOX colored glass has at least one surface under a compressive stress ($\sigma_s$) of at least about 500 MPa and a depth of layer (DOL) of at least about 15 m.

In any aspects relating to the one or more glass compositions described herein (e.g., one or more ion exchangeable colored glass compositions that substantially maintain their original color following an IOX; one or more ion exchangeable, colorable glass compositions to which one or more preselected colors can be imparted by an IOX; and one or more IOX colored glass compositions) and/or one or more processes for making one or more IOX colored glass compositions, an ion exchange treatment (IOX) might be performed at between about 350° C. and 500° C. and/or between about 1 hour and 64 hours.

Also in any aspects relating to the one or more glass compositions described herein, a glass article having a thickness of up to about 1 mm or more might be made using such compositions.

In any aspects relating to the one or more ion exchangeable colored glass compositions that substantially maintain their original color following an IOX, a colorant formulated to impart a preselected color (e.g., any one or more of any of preselected hue {e.g., shades of red, orange, yellow, green, blue, and violet}, preselected saturation, preselected brightness, and/or preselected gloss) to a glass article is added to a glass composition. A colorant can include one or more metal containing dopants in amounts formulated to impart such preselected color. In some aspects, such one or more metal containing dopants can include one or more transition metals, one or more rare earth metals, or one or more transition metals and one or more rare earth metals. In some other aspects, such one or more metal containing dopants can include one or more of one or more of Au, Ag, Cu, Ni, Co, Fe, Mn, Cr, V, Ti, La, Ce, Pr, Nd, Sm, Eu, Gd, Tb, Dy, Ho, Er, Tm, Yb, and Lu; while in still other aspects, such one or more metal containing dopants can include one or more of Au, Ag, Cu, Ni, Co, Fe, Mn, Cr, and V. It will be appreciated that metal containing dopants might be in the form of an element (e.g., Au, Ag . . . etc.) and/or a compound (e.g., CuO, $V_2O_5$, $Cr_2O_3$, $Co_3O_4$, $Fe_2O_3$ . . . etc.). Also, such metal containing dopants are added in amounts formulated to impart a preselected color. Such amounts might be up to 5 mol % and more in any combination of dopants that imparts the preselect color. It will be appreciated that a colorant might be added as a constituent of a batch of materials formulated for melting to a glass composition; as a constituent of an ion exchange bath formulated for imparting color to while at the same time strengthening an ion exchangeable, colorable glass; or both.

In any aspects relating to the one or more ion exchangeable colored glass compositions, a presence of certain metal containing dopants can mpart color while at the same time enhancing one or more properties achieve by an ion exchange treatment. For example, a presence of iron in a glass can impart color while at the same time lead to an increase in compressive stress by increasing stress relaxation times in a manner similar to that obtainable to using one or more alkaline earth ions, such as, for example, Mg, Ca . . . etc. As another example, a presence of vanadium in a glass can impart color while at the same time lead to diffusivity increases in a manner similar to that obtainable to using phosphorous in a glass composition that, in turn, can result in increased depths of layers (DOLs).

In any aspects relating to the one or more glass compositions described herein, including one or more of any of $B_2O_3$, $P_2O_5$, $Al_2O_3$, fluorine . . . and the like in a glass composition can form charged species in a network of such composition glass that can interact with $Na^+$ in a manner so as to modify one or more properties of the resultant glass.

In any aspects relating to the one or more glass compositions described herein, $SiO_2$ can be the main constituent of a glass composition and, as such, can constitute a matrix of the glass. Also, $SiO_2$ can serve as a viscosity enhancer for aiding in a glass's formability while at the same time imparting chemical durability to the glass. Generally, $SiO_2$ can be present in amounts ranging from about 40 mol % up to about 70 mol %. When $SiO_2$ exceeds about 70 mol %, a glass's melting temperature can be impractically high for commercial melting technologies and/or forming technologies. In some aspects, $SiO_2$ might ranging from about 50 mol % up to about 65 mol %, or, alternatively, even from about 50 mol % up to about 55 mol %.

In any aspects relating to the one or more glass compositions described herein, such glass compositions might further include $Al_2O_3$. In some aspects, $Al_2O_3$ can be present in amounts ranging from about 0 to about 25 mol %; alternatively, from about 5 mol % up to about 15 mol %; and, still further, from about 10 mol % to about 20 mol %.

In any aspects relating to the one or more glass compositions described herein, one or more fluxes can be added to a glass composition in amounts that impart to a glass a melting temperature compatible with a continuous manufacturing process, such as, for example, a fusion down-draw formation process, a slot-draw formation process . . . and the like. One example of a flux includes $Na_2O$, which when included in appropriate amounts, can decrease not only a glass's melting temperature but, also, it's liquidus temperature, both of which can contribute to a glass's ease of manufacturing. Additionally following a glass's formation, an inclusion of $Na_2O$ can facilitate it's strengthening by ion exchange (IOX) treatment. To that end, in some aspect, $Na_2O$ can be present in amounts from about 5 mol % to about 35 mol %, while in alternative aspects, from about 15 mol % to about 25 mol %.

In any aspects relating to the one or more glass compositions described herein, $B_2O_3$ might be included in sufficient amounts, for example, to lower a glass's softening point. To that end, in some aspects, $B_2O_3$ can be present in amounts from about 0 to about 10 mol %; while in alternative aspects, from about 0 to about 5 mol % In some other aspects, $B_2O_3$ can be present in amounts from about 1 mol % to about 10 mol %; while in still other alternative aspects, from about 1 mol % to about 5 mol %.

In any aspects relating to the one or more glass compositions described herein, $P_2O_5$ might be included in sufficient amounts, for example, to enhance an ion exchangeability of a glass by shorting an amount of time that might be required to obtain a prespecified level of compressive stress ($\sigma_s$) at a glass's surface while either not reducing or not significantly reducing a corresponding depth of layer (DOL) at the glass's surface. For example for an ion-exchange process performed using a salt bath having a prescribed formulation at a specified temperature, it has been found that an inclusion of $P_2O_5$ in a glass's composition significantly shortens the time required to obtain a prespecified level of compressive stress ($\sigma_s$) at a glass's surface while not significantly reducing a corresponding depth of layer (DOL) at the glass's surface. As a corollary, it has been found for an ion-exchange process performed at a specified temperature for a specified time using a salt bath having a prescribed formulation, that when comparing a depth of layer (DOL) achieved for a glass composition including $P_2O_5$ and that achieved for a corresponding glass composition having no $P_2O_5$, the DOL achieved for the glass including $P_2O_5$ is significantly greater than the DOL achieved for the glass including no $P_2O_5$. To that end, in some aspects relating to the one or more glass compositions described herein, $P_2O_5$ may be substituted for some or all of any included $B_2O_3$. In aspect based on such cases, $P_2O_5$ can be present in amounts from about 0 mol % to about 10 mol %; alternatively, from about 0 mol % to about 5 mol %. In some other aspects relating to the one or more glass compositions described herein having no $B_2O_3$ (i.e., the concentration of $B_2O_3$ is 0 mol %), $P_2O_5$ can be present in amounts from about 1 mol % to about 10 mol %; alternatively, from about 1 mol % to about 5 mol %.

Based on the foregoing, it will be understood that the constituent materials of the one or more glass compositions described herein may be formulated in any one or more variety of combinations so as to generate glass compositions having softening points and/or liquid coefficients of thermal expansion compatible with techniques and/or processes configured for forming glass articles having complex shapes. Also, it would be beneficial that such glass compositions be formulated to be compatible with ion exchange strengthening techniques so that relatively high values of depth of layer (DOL) and/or compressive stress ($\sigma_s$) might be achieved in at least one surface of an article made using such compositions. Some exemplary compositions of such one or more ion exchangeable colored glass compositions; such one or more ion exchangeable, colorable glass compositions; and such one or more IOX colored glass compositions have been and will be described.

As noted, one or more ion exchangeable colored glass compositions and one or more ion exchangeable, colorable glass compositions of this disclosure are formulated so as to be capable of strengthening by an ion-exchange technique. For example, in some aspects, glass articles formed from such exemplary one or more glass compositions described herein may be strengthened by an ion exchange techniques resulting in one or more IOX colored glass compositions having a compressive stress ($\sigma_s$) greater than (>) about 625 MPa and a depth of layer (DOL) greater than about 30 m; alternatively, such compressive stress ($\sigma_s$) may be greater than (>) about 700 MPa. Further, glass articles formed from these exemplary glass compositions may be ion-exchange strengthened such that the one or more IOX colored glass compositions having a compressive stress ($\sigma_s$) equal to or greater than (≥) 750 MPa; alternatively, equal to or greater than (≥) 800 MPa; or instead, equal to or greater than (≥) 850 MPa.

As previously described, articles and/or machines or equipment might be formed from and/or including one or more glass compositions of this disclosure or described herein. For example, cover glasses for electronic devices might be formed using any one of a fusion down-draw process, a slot-draw process, or any other suitable process used for forming glass substrates from a batch of glass raw materials. As a specific example, the one or more ion exchangeable colored glass compositions and one or more ion exchangeable, colorable glass compositions disclosure and described herein might be formed into glass substrates using a fusion down-draw process. Such fusion down-draw process utilizes a drawing tank that has a channel for accepting molten glass raw material. The channel has weirs that open at the top along the length of the channel on both sides of the channel. When the channel fills with molten glass, the molten glass overflows the weirs and, due to gravity, the molten glass flows down the outside surfaces of the drawing tank as two flowing glass surfaces. These outside surfaces extend downwardly and inwardly while joining at an edge below the drawing tank. The two flowing glass surfaces join at this edge and fuse to form a single flowing sheet of molten glass that may be further drawn to a desired thickness. The fusion draw method produces glass sheets with highly uniform, flat surfaces as neither surface of the resulting glass sheet is in contact with any part of the fusion apparatus.

As an alternative specific example, the one or more ion exchangeable colored glass compositions and one or more ion exchangeable, colorable glass compositions of this disclosure and described herein may be formed using a slot-draw process that is distinct from the fusion down-draw process. In the slot-draw process molten glass is supplied to a drawing tank. The bottom of the drawing tank has an open slot with a nozzle that extends the length of the slot. The molten glass flows through the slot/nozzle and is drawn downward as a continuous sheet and into an annealing region.

In some aspects relating to the one or more glass compositions described herein, after a glass substrate is formed, such glass substrate may be further processed and shaped into one or more complex 3-dimensional shapes such as, for example, a concave shape, a convex shape, another desired predetermined geometry . . . etc. A formation of the glass substrate into a glass article having any of the aforementioned complex shapes is enabled by formulating the one or more ion exchangeable colored glass compositions and/or one or more ion exchangeable, colorable glass compositions to be characterized by a relatively low softening point and/or a low liquid coefficient of thermal.

As used herein, the term "ion-exchange strengthened" means that a glass is strengthened by one or more ion-exchange processes as might be known in the art of glass manufacturing. Such ion-exchange processes can include, but are not limited to, communicating at least one surface of a glass article and at least one ion source. The glass articles are made using the one or more ion exchangeable colored glass compositions and/or one or more ion exchangeable, colorable glass compositions of this disclosure. The at least one ion source provides one or more ions having an ionic radius larger than the ionic radius of one or more ions present in the glass's at least one surface. In this manner, ions having smaller radii can replace or be exchanged with ions having larger radii in the glass's at least one surface. Communication can be effected at a temperature within a range of temperatures at which ion inter-diffusion (e.g., the mobility of the ions from the at least one ion source into the glass's surface and ions to replaced from the glass's surface) is sufficiently rapid within a reasonable time (e.g., between about 1 hour and 64 hours ranging at between about 300° C. and 500° C.). Also, typically such temperature is below the glass transition temperature ($T_g$) of the glass when it is desired that, as a result of such communication, a compressive stress ($\sigma_s$) and/or depth of layer (DOL) are attained in the glass's at least one surface. Also, Some examples of ion-exchange include: ions of sodium ($Na^+$), potassium ($K^+$), rubidium ($Rb^+$), and/or cesium ($Cs^+$) being exchanged for lithium ($Li^+$) ions of colored or colorable glass compositions including lithium; ions of potassium ($K^+$), rubidium ($Rb^+$), and/or cesium ($Cs^+$) being exchanged for sodium ($Na^+$) ions of colored or colorable glass compositions including sodium; ions of rubidium ($Rb^+$) and/or cesium ($Cs^+$) being exchanged for potassium ($K^+$) ions of colored or colorable glass compositions including potassium . . . etc. Some examples of at least one ion source include one or more gaseous ion sources, one or more liquid ion sources, and/or one or more solid ion sources. Among one or more liquid ion sources are liquid and liquid solutions, such as, for example molten salts. For example for the above ion-exchange examples, such molten salts can be one or more alkali metal salts such as, but not limited to, one or more halides, carbonates, chlorates, nitrates, sulfites, sulfates, or combinations of two or more of the proceeding. As a further example for the above ion-exchange examples, such one or more alkali metal salts can include, but not be limited to, a molten salt bath including potassium nitrate ($KNO_3$) communicated with the glass's at least one surface. Such communication can be effected at a preselected temperature (e.g., between about 300° C. and 500° C.) for a preselected time (e.g., between about 1 hour and 64 hours) so as to effected the exchange of potassium ($K^+$) ions for any one of lithium ($Li^+$) ions and/or sodium ($Na^+$) ions in the glass's at least one surface so as to strengthen it. A preselected molten salt bath composition for as well as a preselected temperature and a preselected time at which communication is to be effected can be varied depending on the magnitude of compressive stress ($\sigma_s$) and/or depth of layer (DOL) one desires to attain in at least one surface of the glass's surface.

In some aspects relating to the one or more ion exchangeable, colorable glass compositions described herein, glass articles, such as, for example, glass substrates and/or shaped glass articles, are simultaneously strengthened and colored through an ion-exchange process. In such aspects, an at least one ion source, in addition to providing one or more ions having an ionic radius larger than the ionic radius of one or more ions present in the glass's at least one surface, provides colorant including one or more metal containing dopants formulated to impart a preselected color to at least a glass's at least one surface. Such one or more metal containing dopants can be selected from one or more transition metals and/or one or more rare earth metals (e.g., one or more of one or more of Au, Ag, Cu, Ni, Co, Fe, Mn, Cr, V, Ti, La, Ce, Pr, Nd, Sm, Eu, Gd, Tb, Dy, Ho, Er, Tm, Yb, and Lu, alternatively, one or more of Au, Ag, Cu, Ni, Co, Fe, Mn, Cr, and V). In this manner not only are ions having smaller radii replaced or exchanged with ions having larger radii, but also one or more ions preselected for their ability impart the preselected color migrate into glass's at least one surface. As above, some examples of at least one ion source including one or more metal containing dopants include one or more gaseous ion sources, one or more liquid ion sources, and/or one or more solid ion sources. Also above, among one or more liquid ion sources are liquid and liquid solutions, such as, for example molten salts. However, examples of such molten salts, in addition to one or more alkali metal salts, include, in preselected amounts, one or more transition metals salts and/or one or more rare earth metals metal salts (e.g., Thus, some examples of such molten salts can include, but not limited to, one or more halides, cyanides, carbonates, chromates, salts including nitrogen oxide radicals such as nitrates, manganates, molybdates, chlorates, sulfides, sulfites, sulfates, vanadyls, vanadates, tungstates, or combinations of two or more of the proceeding. Some further examples of such molten salts can include those having on or more ions with larger radii and one or more metal containing dopants disclosed in:

[1] G. J. Janz et al., "Molten Salts Data: Diffusion Coefficients in Single and Multi-Component Salt Systems," J. Phys. Chem. Ref. Data, Vol. 11, No. 3, pp. 505-693 (1982) at http://www.nist.gov/data/PDFfiles/jpcrd204.pdf;

[2] K. H. Stern, "High Temperature Properties and Decomposition of Inorganic Salts," J. Phys. Chem. Ref Data, Vol. 3, No. 2, pp. 48-526 (1974) at http://www.nist.gov/data/PDFfiles/jpcrd51.pdf;

[3] G. J. Janz et al., "Molten Salts: Volume 1, Electrical Conductance, Density, and Viscosity Data," Nat. Stand. Ref. Data Ser., NBS (US) 15, 139 pages (October 1968) at http://www.nist.gov/data/nsrds/NSRDS-NBS-15.pdf;

[4] G. J. Janz et al., "Molten Salts: Volume 2, Section 2, Surface Tension Data," Nat. Stand. Ref. Data Ser., NBS (U.S.) 28, 62 pages (August 1969) at http://www.nist.gov/data/nsrds/NSRDS-NBS-28.pdf;

[5] G. J. Janz et al., "Molten Salts: Volume 3, Nitrates, Nitrites and Mixtures, Electrical Conductance, Density, Viscosity and Surface Tension Data," J. Phys. Chem. Ref. Data, Vol. 1, No. 3, pp. 581-746 (1972) at http://www.nist.gov/data/PDFfiles/jpcrd10.pdf;

[6] G. J. Janz et al., "Molten Salts: Volume 4, Part 1, Fluorides and Mixtures, Electrical Conductance, Density, Viscosity and Surface Tension Data," J. Phys. Chem. Ref. Data, Vol. 3, No. 1, pp. 1-116 (1974) at http://www.nist.gov/data/PDFfiles/jpcrd41.pdf;

[7] G. J. Janz et al., "Molten Salts: Volume 4, Part 2, Chlorides and Mixtures, Electrical Conductance, Density, Viscosity and Surface Tension Data," J. Phys. Chem. Ref. Data, Vol. 4, No. 4, pp. 871-1178 (1975) at http://www.nist.gov/data/PDFfiles/jpcrd71.pdf;

[8] G. J. Janz et al., "Molten Salts: Volume 4, Part 3, Bromides and Mixtures, Iodides and Mixtures," J. Phys. Chem. Ref. Data, Vol. 6, No. 2, pp. 409-596 (1977) at http://www.nist.gov/data/PDFfiles/jpcrd96.pdf;

[9] G. J. Janz et al., "Molten Salts: Volume 4, Part 4, Mixed Halide Melts, Electrical Conductance, Density, Viscosity and Surface Tension Data," J. Phys. Chem. Ref. Data, Vol. 8, pp. 125-302 (1979) at http://www.nist.gov/data/PDFfiles/jpcrd135.pdf;

[10] G. J. Janz et al., "Molten Salts: Volume 5, Part 1, "Additional Systems with Common Anions; Electrical Conductance, Density, Viscosity, and Surface Tension Data," J. Phys. Chem. Ref. Data. Vol. 9, No. 4, pp. 831-1020 (1980) at http://www.nist.gov/data/PDFfiles/jpcrd168.pdf;

[11] G. J. Janz et al., "Molten Salts: Volume 5, Part 2, "Additional Systems with Common Anions; Electrical Conductance, Density, Viscosity, and Surface Tension Data," J. Phys. Chem. Ref. Data. Vol. 12, No. 3, pp. (1983) at http://www.nist.gov/data/PDFfiles/jpcrd230.pdf;

[12] G. J. Janz et al., "Physical Properties Data Compilations Relevant to Energy Storage: I. Molten Salts: Eutectic Data," NSRDS-NBS 61, Part I, U.S. Gov't Printing Office, Washington, DC (1978) at http://www.nist.gov/data/nsrds/NSRDS-NBS-61-1.pdf; and

[13] G. J. Janz et al., "Physical Properties Data Compilations Relevant to Energy Storage. II. Molten Salts: Data on Single and Multi-Component Systems," NSRDS-NBS 61, Part II, U.S. Gov't Printing Office, Washington, DC (1979) at http://www.nist.gov/data/nsrds/NSRDS-NBS61-II.pdf, such as, without limitation, any one of $FeCl_2$—$KCl$, $Cs_2Cr_2O_7$—$Rb_2Cr_2O_7$, $KCl$—$NbOCl_3$, $KCl$—$K_2Cr_2O_7$, $FeCl_2$—$KCl$—$NdCl_3$, $KCl$—$NbOCl_3$, $Rb_2O$—$V_2O_5$, $CsBr$—$TiCl$, $KCl$—$MnCl_2$—$NaCl$, $KCl$—$MnCl_2$, $MnCl_2$—$RbCl$, $CsCl$—$MnCl_2$, $CoCl_2$—$KCl$, $CoCl_2$—$RbCl$, $K_2CO_3$—$K_2Mo_4O_{13}$, $CuCl_2$—$KCl$, $CuSO_4$—$K_2SO_4$, $K_2SO_4$—$MoO_3$, $AgVO_3$—$K_2SO_4$—$KVO_3$, $Ag_2SO_4$—$AgVO_3$—$K_2SO_4$, $AgCl$—$KVO_3$, $CoCl_2$—$NaCl$ . . . etc. Similar to above, communication can be effected at a temperature within a range of temperatures at which ion inter-diffusion (e.g., the mobility of the ions from the at least one ion source into the glass's surface and ions to replaced from the glass's surface) is sufficiently rapid within a reasonable time (e.g., between about 1 hour and 64 hours ranging at between about 300° C. and 500° C.). Also, typically such temperature is below the glass transition temperature (Tg) of the glass when it is desired that, as a result of such communication, a compressive stress ($\sigma_s$) and/or depth of layer (DOL) are attained in at least one of the glass's surfaces. A preselected molten salt bath composition for as well as a preselected temperature and a preselected time at which communication is to be effected can be varied depending on the magnitude of compressive stress ($\sigma_s$) and/or depth of layer (DOL) and/or color one desires to attains in the glass's at least one surface.

The compositions and properties of the aforementioned one or more glass compositions described herein (e.g., one or more ion exchangeable colored glass compositions that substantially maintain their original color following an IOX; one or more ion exchangeable, colorable glass compositions to which one or more preselected colors can be imparted by an IOX; and one or more IOX colored glass compositions) will be further clarified with reference to the following examples.

EXAMPLES

Example Glasses A-F

Example glasses A-F described in the following were batched with Si as sand, Al as alumina, Na as both soda ash and sodium nitrate, B as boric acid, and P as aluminum metaphosphate. For example glasses A-F, six distinct compositions were formulated so that each had a different colorant including one or more metal containing dopants formulated to impart a different preselected color added to the batch with iron (Fe) added as $Fe_2O_3$, vanadium (V) added as $V_2O_5$, chromium (Cr) added as $Cr_2O_3$, cobalt (Co) added as $Co_3O_4$, copper (Cu) added as CuO, and gold (Au) added as Au. The batch materials were melted at 1600° C. for four hours and then poured and annealed between 550° C. and 650° C. The compositions of example glasses A-F were analyzed by inductively coupled plasma and/or atomic absorption and/or X-ray fluorescence (XRF) techniques to determine the mol % of the constituent materials in each. The specific compositions for each of example glasses A-F are reported in Table I.

TABLE I

Glass Composition in Mole Percent [Mol %]
Example Glass

| | A | B | C | D | E | F |
|---|---|---|---|---|---|---|
| $Al_2O_3$ | 8.28 | 8.52 | 8.40 | 8.51 | 8.48 | 8.48 |
| Au | 0.00 | 0.00 | 0.00 | 0.00 | 0.00 | 0.01 |
| CaO | 0.51 | 0.48 | 0.51 | 0.48 | 0.48 | 0.48 |
| Cl | 0.00 | 0.01 | 0.01 | 0.00 | 0.00 | 0.01 |
| $Co_3O_4$ | 0.00 | 0.00 | 0.00 | 0.10 | 0.00 | 0.00 |
| $Cr_2O_3$ | 0.00 | 0.00 | 0.27 | 0.00 | 0.00 | 0.00 |
| CuO | 0.00 | 0.00 | 0.00 | 0.00 | 0.90 | 0.00 |
| $Fe_2O_3$ | 0.70 | 0.01 | 0.01 | 0.01 | 0.01 | 0.01 |
| $K_2O$ | 1.04 | 1.13 | 1.12 | 1.11 | 1.12 | 1.10 |
| MgO | 9.27 | 6.42 | 7.12 | 6.73 | 6.31 | 6.53 |
| $Na_2O$ | 13.69 | 13.64 | 14.19 | 13.81 | 13.55 | 13.78 |
| $P_2O_5$ | 0.00 | 0.00 | 0.00 | 0.00 | 0.00 | 0.00 |
| $SO_3$ | 0.00 | 0.00 | 0.00 | 0.01 | 0.00 | 0.01 |
| $SiO_2$ | 66.34 | 68.85 | 68.18 | 69.04 | 68.96 | 69.40 |
| $SnO_2$ | 0.15 | 0.16 | 0.17 | 0.17 | 0.16 | 0.18 |
| $TiO_2$ | 0.00 | 0.01 | 0.01 | 0.00 | 0.01 | 0.01 |
| $V_2O_5$ | 0.00 | 0.75 | 0.00 | 0.00 | 0.00 | 0.00 |
| ZnO | 0.00 | 0.00 | 0.01 | 0.01 | 0.00 | 0.00 |
| Total | 100.00 | 100.00 | 100.00 | 100.00 | 100.00 | 100.00 |

Also each of example glasses A-F had been imparted with color by the batched the one or more metal containing dopants—namely: glass A having an iron (FE) dopant was an olive green; glass B having an vanadium (V) dopant was a yellow; glass C having an chromium (Cr) dopant was a green; glass D having a cobalt (Co) dopant was a dark blue; glass E having a copper (Cu) dopant was a patina green; and glass F having a gold (Au) dopant was a red. Substrates of each of example glasses A-F were prepare so as to have an as-made substrate for comparison and a suitable number of substrates available for treatment by ion-exchange under a variety of conditions. Photographs (which have been converted from color to black-gray-white) of each of example glasses A-F are presented in FIG. 1 in the column having the "As-Made" heading.

Samples 1-18

For each of example glasses A-F, as-made substrates of each were communicated a $KNO_3$ salt bath at a temperature of about 410° C. for 2 [h] hours, 4 [h], and 8 [h] thereby producing Samples 1-18.

As noted above, a replacement of smaller ions with larger ions creates a compressive stress ($\sigma_s$) at a glass's surface and/or a surface layer that is under compression, or a compressive stress (CS). Such surface layer extends from the glass's surface into its interior or bulk to a corresponding depth of layer (DOL). The compressive stress (CS) in such surface layer is balanced by a tensile stress, or central tension (CT) in the glass's interior or inner region.

Compressive stress ($\sigma_s$), compressive stress (CS), and corresponding depth of layer (DOL) can be conveniently be measured, without limitation, using conventional optical techniques and instrumentation such as commercially available surface stress meter models FSM-30, FSM-60, FSM-6000LE, FSM-7000H . . . etc. available from Luceo Co., Ltd. and/or Orihara Industrial Co., Ltd., both in Tokyo, Japan (see e.g., FSM-30 Surface Stress Meter Brochure, Cat no. FS-0013E at http://www.orihara-ss.co.jp/catalog/fsm/fsm-30-Ecat.pdf; FSM-60 Surface Stress Meter Brochure, Cat no. FS-0013E at http://www.luceo.co.jp/english/pdf/FSM-60LE%20Ecat.pdf; FSM-6000LE Surface Stress Meter Brochure, Revision 2009.04 at http://www.luceo.co.jp/english/pdf/FSM-6000LE%20Ecat.pdf; FSM-7000H Surface Stress Meter Brochure, Cat no. FS-0024 2009.08 at http://www.luceo.co.jp/catalog/catalog-pdf/FSM-7000H_cat.pdf; T. Kishii, "Surface Stress Meters Utilizing the Optical Waveguide Effect of Chemically Tempered Glasses," Optics & Lasers in Engineering 4 (1983) pp. 25-38 at http://www.orihara-ss.co.jp/data/literature01/A034.pdf; and K. Kobayashi et al., "Chemical Strengthening of Glass and Industrial Application," [52 (1977)], pp. 109-112 at http://www.orihara-ss.co.jp/data/literature01/A001.pdf, all of which are incorporated by reference herein). Such conventional optical techniques and instrumentation involve methods of measuring compressive stress and depth of layer as described in ASTM 1422C-99, entitled "Standard Specification for Chemically Strengthened Flat Glass," and ASTM 1279.19779 "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. Surface stress measurements rely upon the accurate measurement of the stress optical coefficient (SOC), which is related to the stress-induced birefringence of the glass. SOC in turn is measured by those methods that are known in the art, such as fiber and four point bend method, both of which are described in ASTM standard C770-98 (2008), entitled "Standard Test Method for Measurement of Glass Stress-Optical Coefficient," the contents of which are incorporated herein by reference in their entirety, and a bulk cylinder method.

Compressive stress ($\sigma_s$) and a corresponding depth of layer (DOL) for each of Samples 1-18 were determined using the above conventional optical techniques and instrumentation. Values for the depth of layer (DOL) in micrometers [µm] and values for the compressive stress ($\sigma_s$) in megapascal [MPa] are reported for each of the Samples 1-18 in Tables II-IV, where Table II includes the results for Samples 1-6, IOX for 2 [h] at 410° C.; Table III includes the results for Samples 7-12, IOX for 4 [h] at 410° C.; and Table IV includes the results for Samples 7-12, IOX for 8 [h] at 410° C.

TABLE II

IOX 2 [h] at 410° C.
Sample

| | 1 | 2 | 2 | 4 | 5 | 6 |
|---|---|---|---|---|---|---|
| σs avg | 882.8 | 838.2 | 866.8 | 856.2 | 844.9 | 844.0 |
| st dev σs | 5.1 | 3.2 | 9.8 | 1.8 | 1.5 | 5.3 |
| DOL avg | 15.6 | 20.9 | 19.1 | 18.9 | 17.6 | 20.0 |
| st dev DOL | 0.2 | 0.5 | 0.4 | 0.0 | 0.0 | 0.2 |

TABLE III

IOX 4 [h] at 410° C.
Sample

| | 7 | 8 | 9 | 10 | 11 | 12 |
|---|---|---|---|---|---|---|
| σs avg | 883.9 | 837.6 | 874.9 | 852.8 | 842.9 | 855.0 |
| st dev σs | 6.0 | 3.6 | 6.8 | 3.8 | 1.9 | 2.4 |
| DOL avg | 22.4 | 29.4 | 25.5 | 25.0 | 24.5 | 27.0 |
| st dev DOL | 0.2 | 0.2 | 0.8 | 0.3 | 0.0 | 0.1 |

TABLE IV

| | IOX 8 [h] at 410° C. Sample | | | | | |
|---|---|---|---|---|---|---|
| | 13 | 14 | 15 | 16 | 17 | 18 |
| σs avg | 858.2 | 809.6 | 850.1 | 832.1 | 819.1 | 827.7 |
| st dev σs | 7.3 | 4.0 | 5.9 | 2.6 | 3.3 | 1.6 |
| DOL avg | 30.8 | 40.6 | 37.4 | 35.0 | 34.1 | 37.6 |
| st dev DOL | 1.6 | 0.8 | 0.7 | 0.6 | 0.0 | 0.9 |

FIG. 2 graphically depicts the compressive stress ($\sigma_s$) in MPa as a function of ion exchange treatment (IOX) time (t [h]) in a $KNO_3$ bath at 410° C. for substrates of IOX colored glass compositions (i.e., Samples 1-18) and made using the different dopants. It can be seen from FIG. 2 that the $\sigma_s$ achieved, regardless of the IOX time and type of colorant, ranges from about 810 MPa to greater than 880 MPa. Further review of FIG. 2 reveals that those substrates including iron (Fe) in the colorant achieved the highest $\sigma_s$, while those including Vanadium (V) exhibited the lowest $\sigma_s$ values, regardless of the particular IOX time. In particular, $\sigma_s$ values of Fe dopant substrates were between 880 and 890 MPa for 2 [h] and 4 [h] treatments, and approximately 855 MPa for the 8 [h] treatment, while the $\sigma_s$ values of V dopant substrates exhibited were between 830 and 840 MPa for 2 [h] and 4 [h] treatments, and approximately 810 MPa for the 8 [h] treatments.

Figure 3:
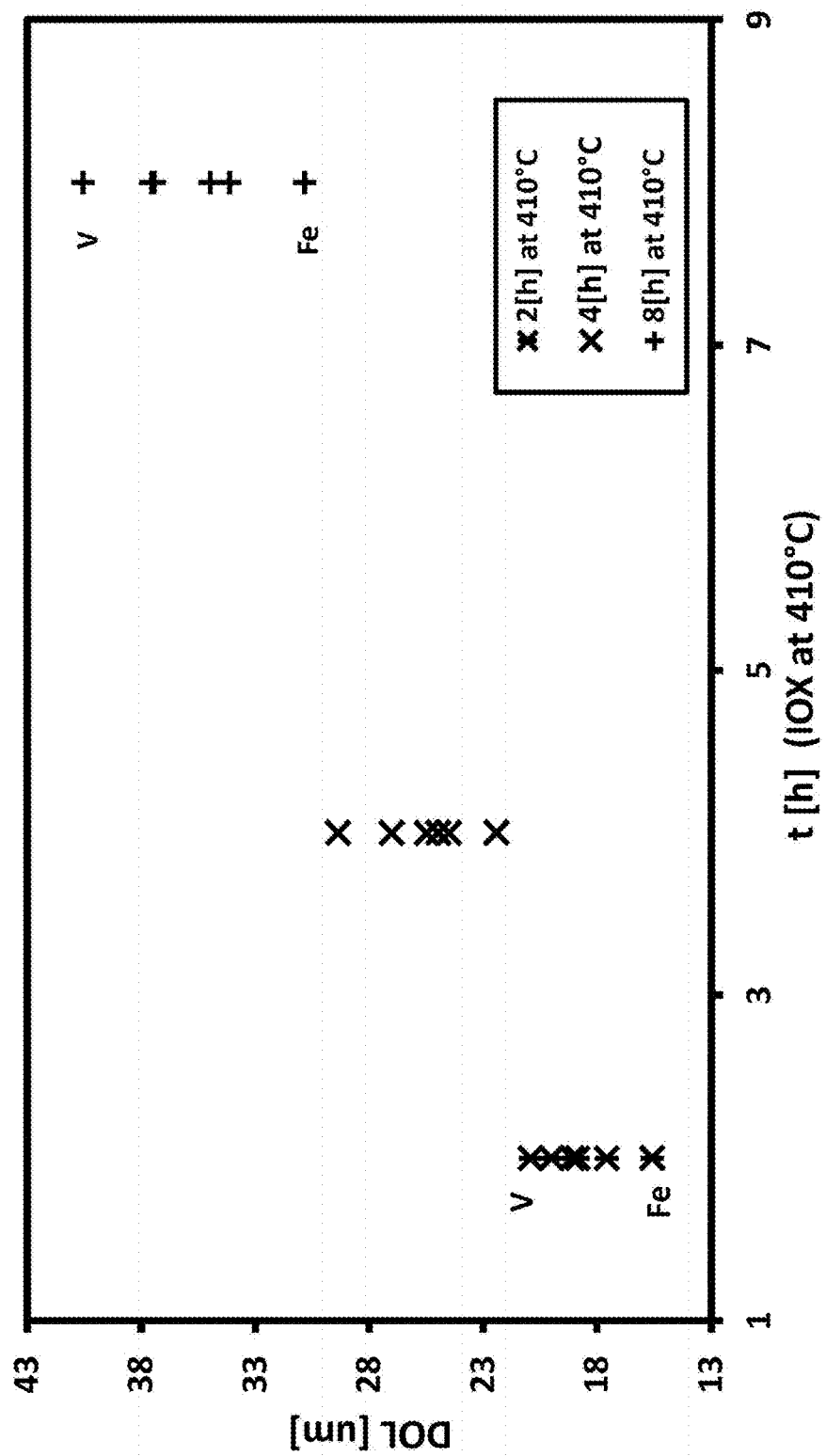
FIG. 3 shows the depth of layer (DOL) as a function of IOX time (t [h]) at 410° C. for the substrates of IOX colored glass compositions (i.e., Samples 1-18) of FIG. 2 according to aspects of embodiments and/or embodiments of this disclosure.

FIG. 3 graphically depicts the depth of layer (DOL) in μm as a function of ion exchange treatment (IOX) time (t [h]) in a $KNO_3$ bath at 410° C. for substrates of IOX colored glass compositions (i.e., Samples 1-18) and made using the different dopants. It can be seen from FIG. 3 that the DOL achieved, regardless of the IOX time and type of colorant, ranges from about 15 μm to approximately 40 μm. In contrast to the σs values, substrates including iron (Fe) in the colorant achieved the lowest DOL values while those including Vanadium (V) exhibited the highest DOL values, regardless of the particular IOX time. In particular, the DOL values of Fe dopant substrates ranged between 15 to 30 μm the three IOX times at 410° C., while the DOL values of V dopant substrates ranged between 20 and 40 μm for the three IOX times at 410° C.

Figure 4:
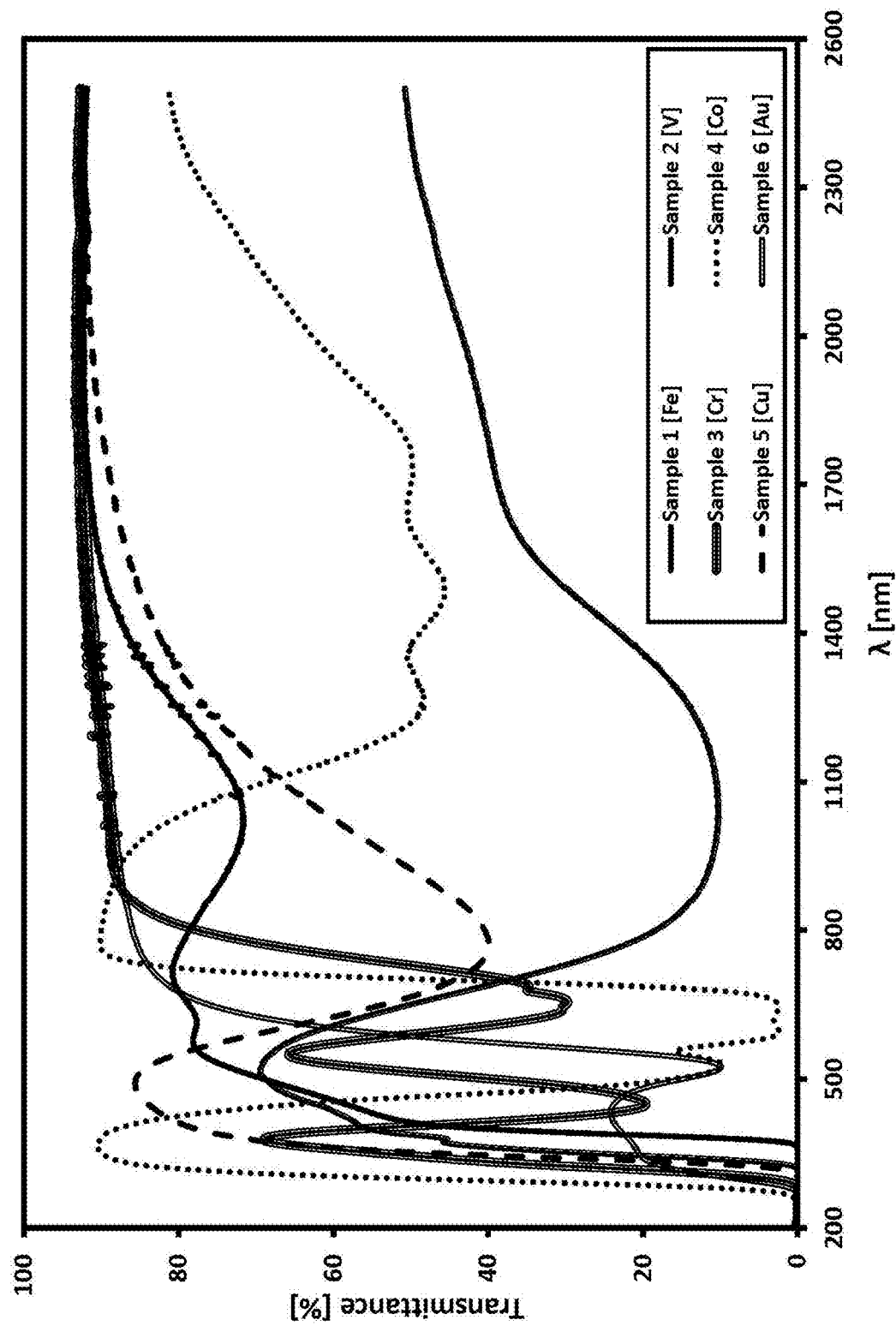
FIG. 4 shows the transmittance [%] as a function of wavelength, λ [nm], for the substrates of IOX colored glass compositions (i.e., Samples 1-6) made by an IOX at 410° C. for 2 [h] according to aspects of embodiments and/or embodiments of this disclosure.
Figure 5:
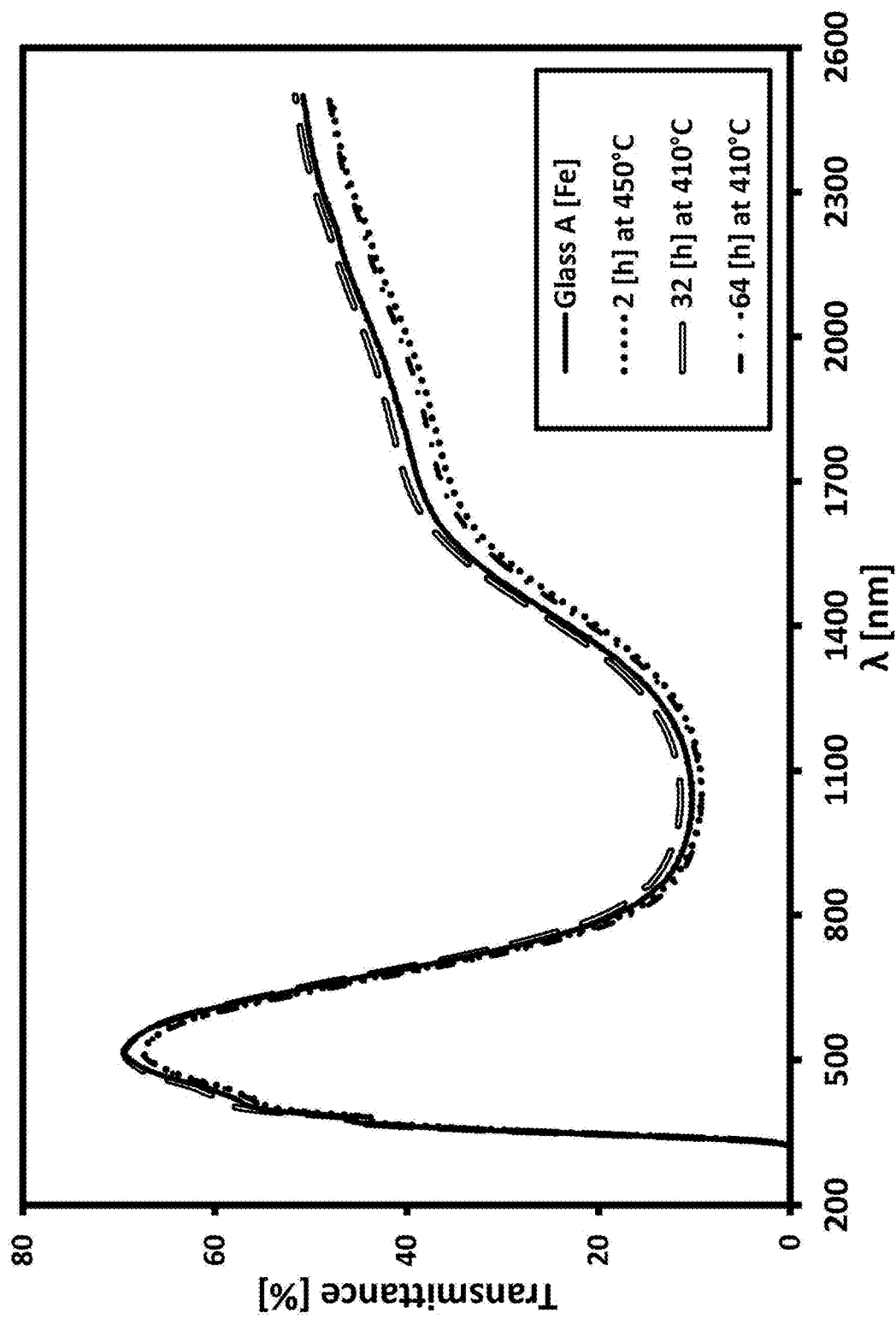
FIG. 5 shows the transmittance [%] as a function of wavelength, λ [nm], for substrates of ion exchangeable Glass A colored using a iron (Fe) dopant and corresponding IOX colored glass compositions IOX at 450° C. for 2 [h], 410° C. for 32 [h], and 410° C. for 64 [h] (i.e., Samples 19, 25, & 31, respectively) of FIG. 1 according to aspects of embodiments and/or embodiments of this disclosure.
Figure 6:
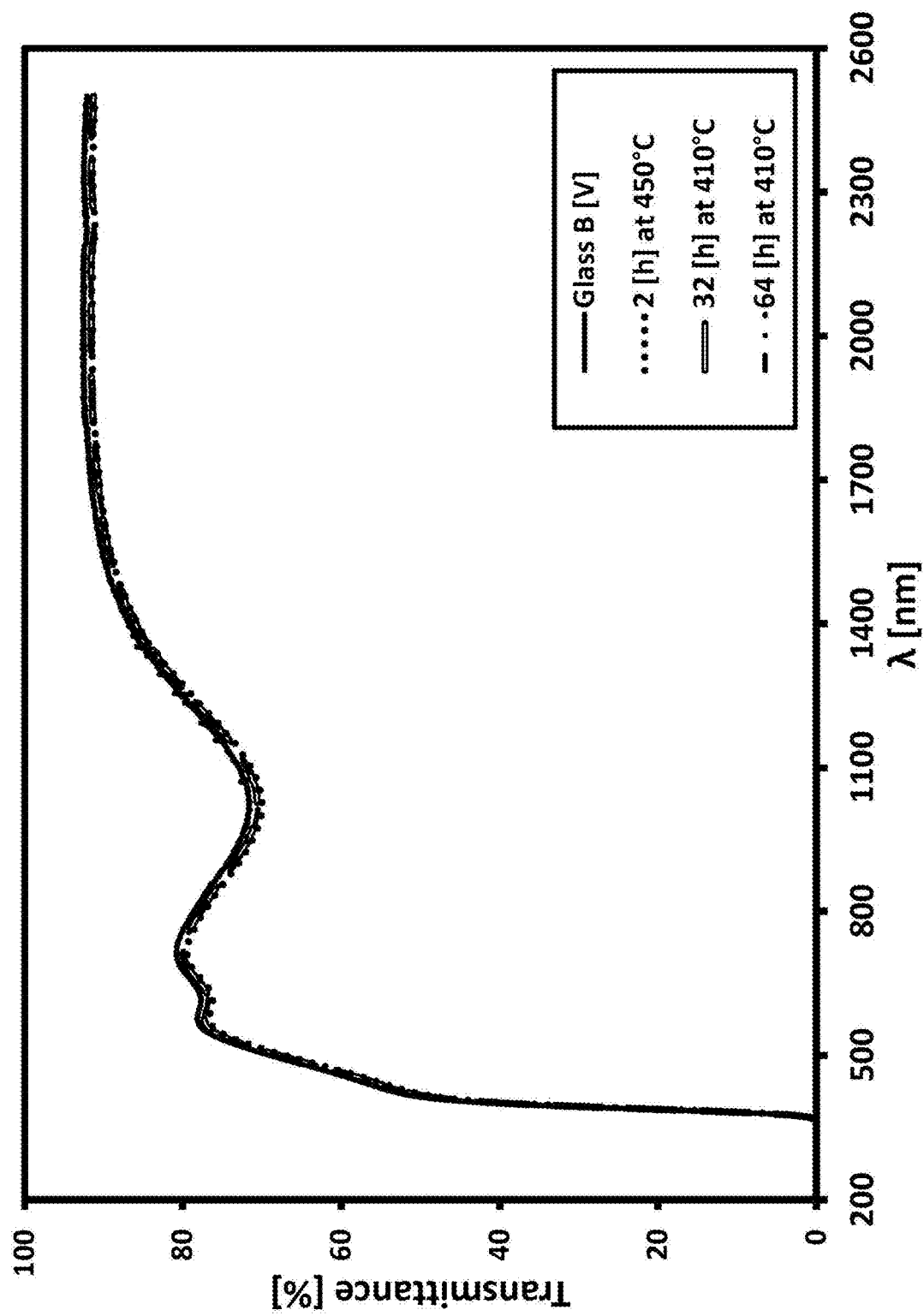
FIG. 6 shows the transmittance [%] as a function of wavelength, λ [nm], for substrates of ion exchangeable Glass B colored using a vanadium (V) dopant and corresponding IOX colored glass compositions IOX at 450° C. for 2 [h], 410° C. for 32 [h], and 410° C. for 64 [h] (i.e., Samples 20, 26, & 32, respectively) of FIG. 1 according to aspects of embodiments and/or embodiments of this disclosure.
Figure 7:
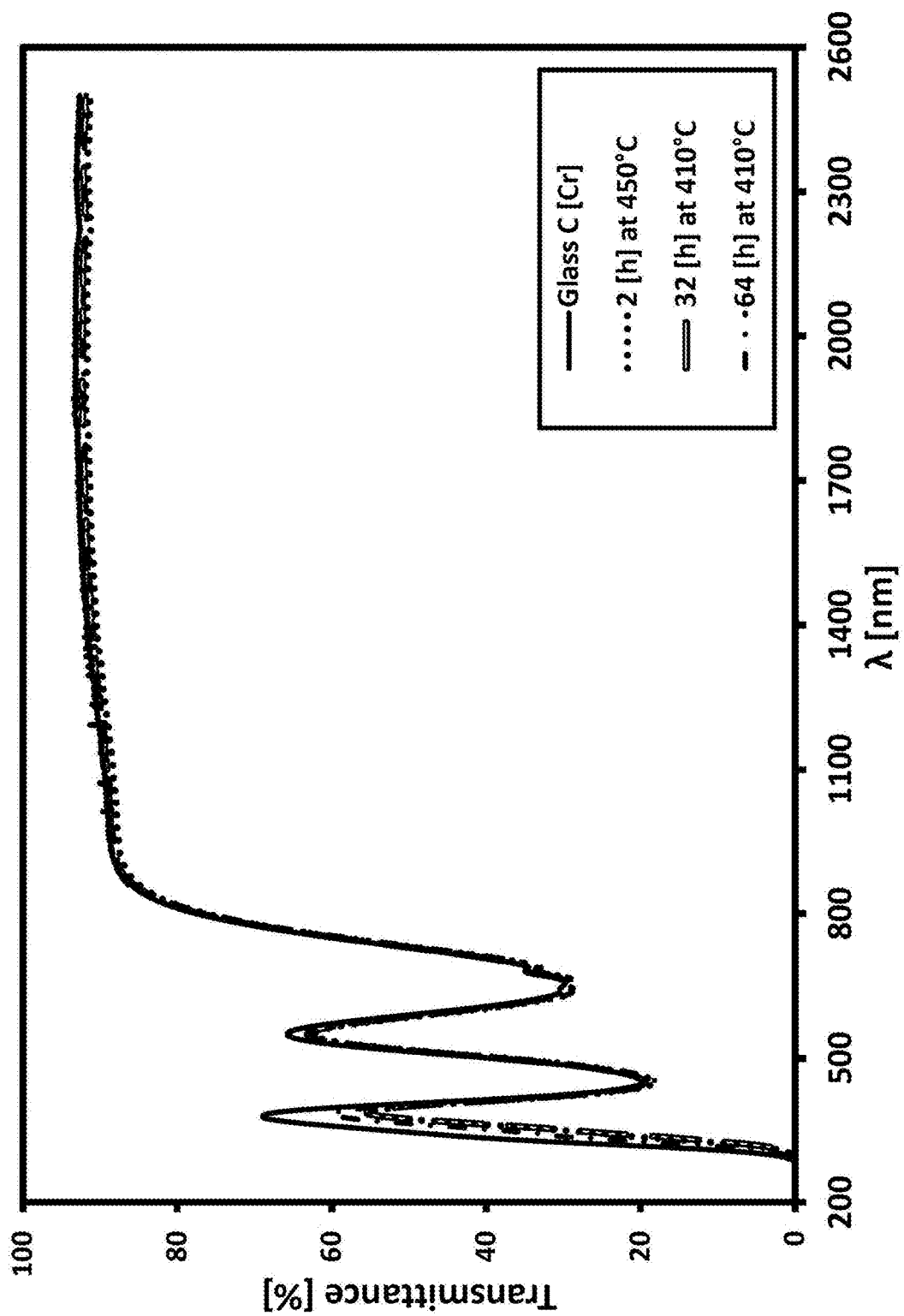
FIG. 7 shows the transmittance [%] as a function of wavelength, λ [nm], for substrates of ion exchangeable Glass C colored using a chromium (Cr) dopant and corresponding IOX colored glass compositions IOX at 450° C. for 2 [h], 410° C. for 32 [h], and 410° C. for 64 [h] (i.e., Samples 21, 27, & 33, respectively) of FIG. 1 according to aspects of embodiments and/or embodiments of this disclosure.
Figure 8:
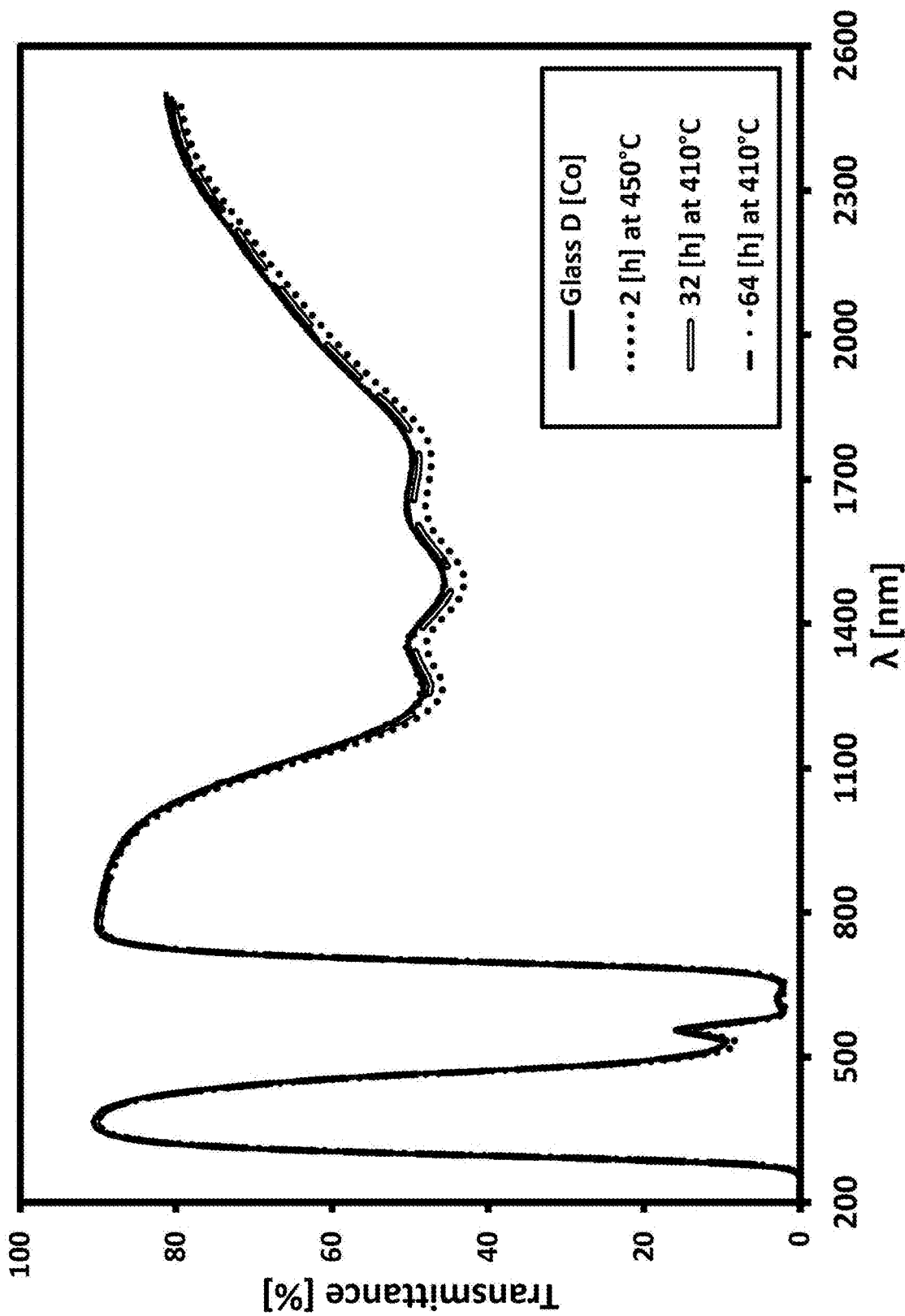
FIG. 8 shows the transmittance [%] as a function of wavelength, λ [nm], for substrates of ion exchangeable Glass D colored using a cobalt (Co) dopant and corresponding IOX colored glass compositions IOX at 450° C. for 2 [h], 410° C. for 32 [h], and 410° C. for 64 [h] (i.e., Samples 22, 28, & 34, respectively) of FIG. 1 according to aspects of embodiments and/or embodiments of this disclosure.
Figure 9:
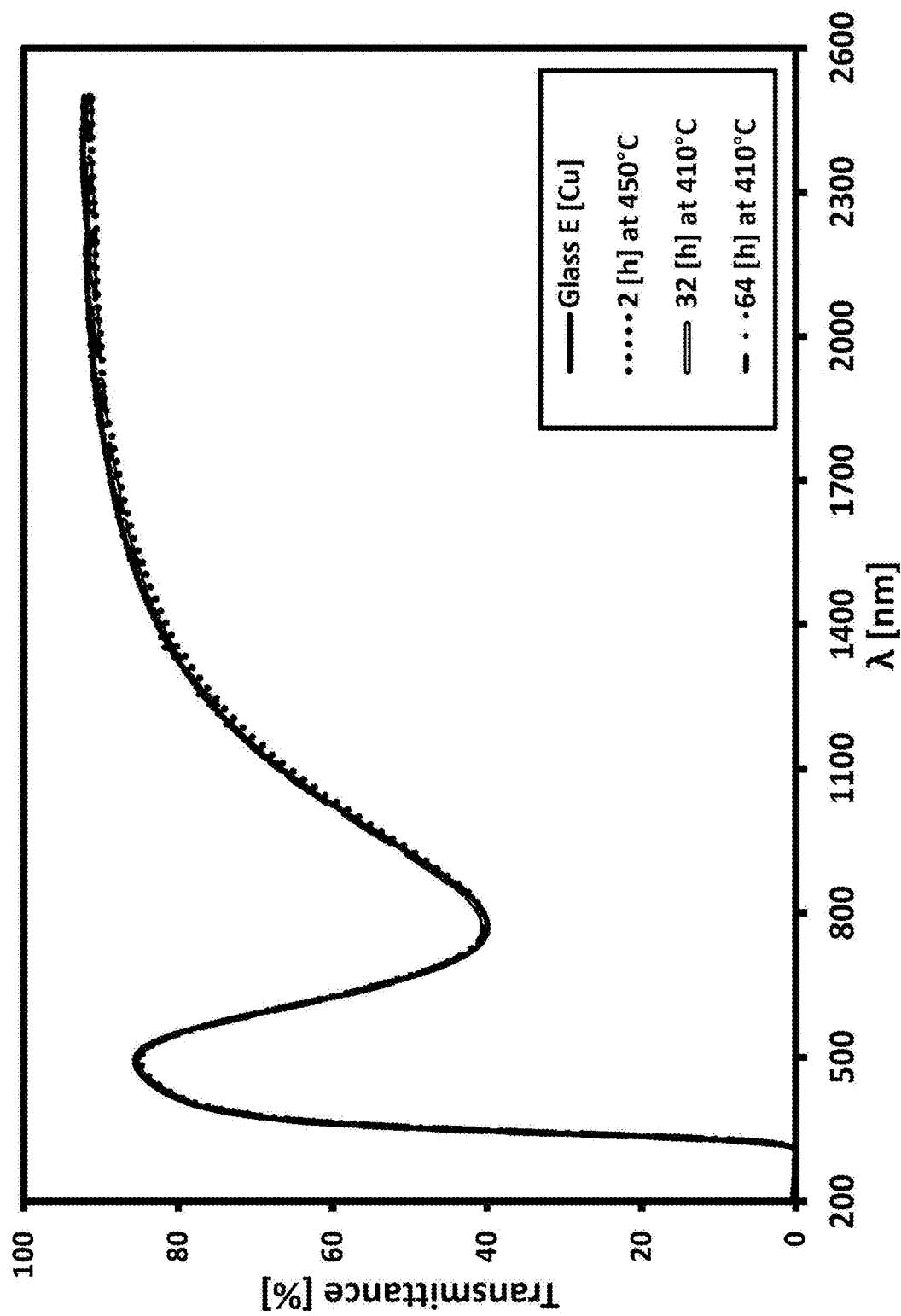
FIG. 9 shows the transmittance [%] as a function of wavelength, λ [nm], for substrates of ion exchangeable Glass E colored using a copper (Co) dopant and corresponding IOX colored glass compositions IOX at 450° C. for 2 [h], 410° C. for 32 [h], and 410° C. for 64 [h] (i.e., Samples 23, 29, & 35, respectively) of FIG. 1 according to aspects of embodiments and/or embodiments of this disclosure.
Figure 10:
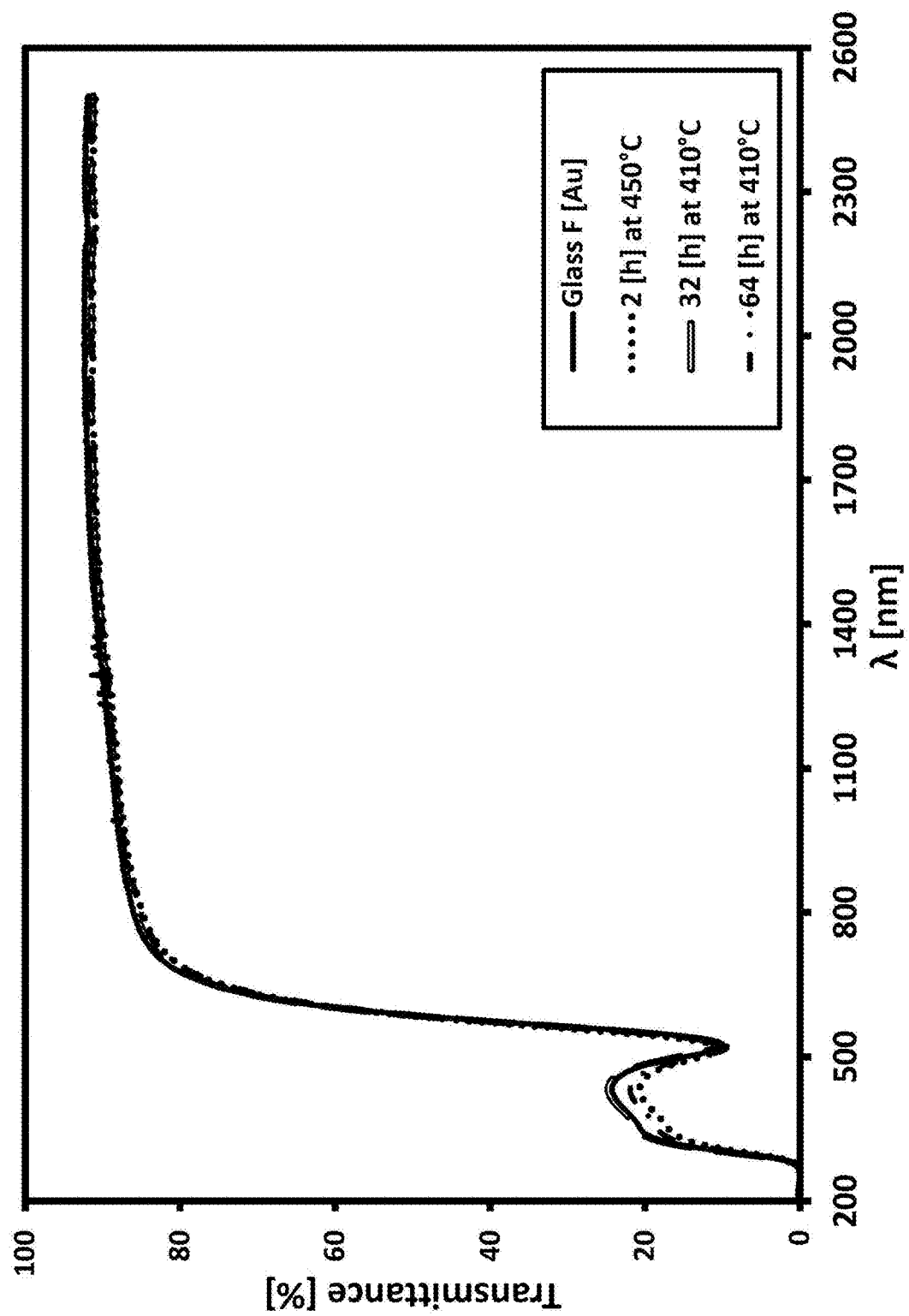
FIG. 10 shows the transmittance [%] as a function of wavelength, λ [nm], for substrates of ion exchangeable Glass F colored using a gold (Au) dopant and corresponding IOX colored glass compositions IOX at 450° C. for 2 [h], 410° C. for 32 [h], and 410° C. for 64 [h] (i.e., Samples 24, 30, & 36, respectively) of FIG. 1 according to aspects of embodiments and/or embodiments of this disclosure.

FIG. 4 graphically depicts the transmittance [%] as a function of wavelengths, λ [nm], from 200 nanometers [nm] to 2500 nm for the variety of samples of IOX colored glass compositions (i.e., Samples 1-6) based on substrates of example glasses A-F subjected to IOX using a $KNO_3$ bath at 410° C. for 2 [h]. Transmittance spectra of FIG. 4 for Samples 1-6 were obtained using the commercially available a Hitachi U4001 spectrophotometer equipped with 60 mm diameter integrating sphere. The Hitachi U4001 spectrophotometer was configured with following measurement parameters: in the range of λ [nm] from 200-800, the settings were Scan Speed: 120 nm/min and Bandwidth—PMT—3.0 nm and, with a detector change at 800 nm, in the range of λ [nm] from 800-2500, the settings were Scan Speed: 300 nm/min and Bandwidth—PbS—Servo, Gain—4 while in the range of λ [nm] from 200-340, the source was deuterium based and, with a source change at 340 nm, in the range of λ [nm] from 340-2500, the source was tungsten halogen based. No aperture was used over the entire range of λ [nm] from 200-2500 nm. The surfaces of each sample was polished to an optical finish. Prior to measurement, the flats of each sample were cleaned using a first low linting wiper saturated with a solution of 1% micro soap concentrate in deionized (DI) water; rinsed using DI water; dried using a second linting wiper; and finally wiped using a third wiper dampened with HPLC grade reagent alcohol.

Samples 19-36

For each of example glasses A-F, as-made substrates of each were communicated a $KNO_3$ salt bath at a temperature of about 450° C. for 2 [h] hours and a $KNO_3$ salt bath at a temperature of about 410° C. for 32 [h], and 64 [h] thereby producing Samples 19-36.

Returning to FIG. 1 shows a matrix of photographs (which have been converted from color to black-gray-white) illustrating a retention of original hue without fading or running (e.g., colorfastness) of ion exchangeable colored glass compositions and IOX colored glass compositions. Photographs (which have been converted from color to black-gray-white) of each of example glasses A-F are presented in FIG. 1 in the column having the "As-Made" heading and compared to photographs of samples of these glasses following IOX in $KNO_3$ at 450° C. for 2 [h]; IOX in $KNO_3$ at 410° C. for 32 [h]; and IOX in $KNO_3$ at 410° C. for 64 [h]. Even without color, the photographs in FIG. 1 demonstrate retention of original or "as-made" hue without fading and/or running (e.g., colorfastness). To quantify such "as-made" hue retention, the transmittance [%] as a function of wavelength, λ [nm], for example glasses A-F and Samples 19-36 where measured and compared. FIGS. 5-10 graphically depict the transmittance [%] as a function of wavelength, λ [nm], for substrates of: ion exchangeable Glass A colored using an iron (Fe) dopant and corresponding IOX colored glass compositions (i.e., Samples 19, 25, & 31); ion exchangeable Glass B colored using a vanadium (V) dopant and corresponding IOX colored glass compositions (i.e., Samples 20, 26, & 32); ion exchangeable Glass C colored using a chromium (Cr) dopant and corresponding IOX colored glass (i.e., Samples 21, 27, & 33); ion exchangeable Glass D colored using a cobalt (Co) dopant and corresponding IOX colored glass compositions (i.e., Samples 22, 28, & 34); ion exchangeable Glass E colored using a copper (Co) dopant and corresponding IOX colored glass compositions (i.e., Samples 23, 29, & 35); and ion exchangeable Glass E colored using a gold (Au) dopant and corresponding IOX colored glass compositions (i.e., Samples 24, 30, & 36). These transmittance spectra were obtained using the Hitachi U4001 spectrophotometer equipped with 60 mm diameter integrating sphere in the manner described above. It can be seen from FIGS. 5-10 that the transmission spectra for each as-made glass composition and its corresponding IOX colored samples are similarly shaped confirming demonstrating the visual observation of original or "as-made" hue retention. Also it can be seen that the spectra substantially coincide in the range of λ [nm] from about 250-500 for Fe dopant and V dopant compositions: in the range of λ [nm] from about 250-800 for Co dopant and Cu dopants compositions while appearing to slightly diverge for Cr dopant and Au dopants compositions in the range of λ [nm] from about 250-500.

The transmittance [%] as a function of wavelength, λ [nm] data of FIGS. 5-10 were transformed into L*; a*; and b* CIELAB color space coordinates by means of an analytical software (e.g., UV/VIS/NIR application pack of the GRAMS spectroscopy software suite commercially available from Thermo Scientific West Palm Beach, FL, US) for CIE Illuminant D65 and a 10° Observer, as presented in Table V; for CIE Illuminant F02 and a 10° Observer, as presented in Table VI; and for CIE Illuminant A and a 10° Observer, as presented in Table VII. In addition, a color difference:

$$\Delta E = \left[\{\Delta L^*\}^2 + \{\Delta a^*\}^2 + \{\Delta b^*\}^2\right]^{0.5}$$

was determined using the L*; a*; and b* CIELAB color space coordinates obtained for the as-made colored glass before IOX treatment and the IOX colored glasses after treatment for each CIE Illuminant-Observer combination and are also summarized in the Tables V-VII.

TABLE V

| | Hitachi U4001 Sample Thickness: 1 [mm] Scan Range: 200-2500 [nm] | CIE Illuminant D65-10° Observer | | | |
|---|---|---|---|---|---|
| Sample | Condition | L* | a* | b* | ΔE |
| A | Glass A-As Made | 84.83 | −8.09 | 2.56 | NA |
| B | Glass B-As Made | 89.24 | −1.64 | 13.67 | NA |
| C | Glass C-As Made | 76.69 | −18.78 | 33.96 | NA |
| D | Glass D-As Made | 42.24 | 27.14 | −67.02 | NA |
| E | Glass E-As Made | 90.40 | −10.21 | −5.07 | NA |
| F | Glass F-As Made | 62.24 | 42.75 | 12.90 | NA |
| 19 | Glass A-2 [h] at 450° C. | 83.84 | −8.10 | 2.65 | 1.00 |
| 20 | Glass B-2 [h] at 450° C. | 88.47 | −1.65 | 14.31 | 1.00 |
| 21 | Glass C-2 [h] at 450° C. | 75.02 | −18.83 | 34.08 | 1.67 |
| 22 | Glass D-2 [h] at 450° C. | 39.87 | 30.92 | −69.53 | 5.12 |
| 23 | Glass E-2 [h] at 450° C. | 90.27 | −9.93 | −4.71 | 0.48 |
| 24 | Glass F-2 [h] at 450° C. | 63.05 | 39.77 | 20.72 | 8.41 |
| 25 | Glass A-32 [h] at 410° C. | 84.89 | −7.61 | 1.62 | 1.06 |
| 26 | Glass B-32 [h] at 410° C. | 88.79 | −1.71 | 14.15 | 0.66 |
| 27 | Glass C-32 [h] at 410° C. | 75.65 | −18.39 | 33.20 | 1.34 |
| 28 | Glass D-32 [h] at 410° C. | 41.55 | 28.05 | −67.69 | 1.32 |
| 29 | Glass E-32 [h] at 410° C. | 90.31 | −10.11 | −5.02 | 0.15 |
| 30 | Glass F-32 [h] at 410° C. | 62.76 | 41.63 | 12.83 | 1.23 |
| 31 | Glass A-64 [h] at 410° C. | 83.76 | −8.42 | 2.22 | 1.17 |
| 32 | Glass B-64 [h] at 410° C. | 88.79 | −1.71 | 14.18 | 0.68 |
| 33 | Glass C-64 [h] at 410° C. | 75.19 | −18.57 | 34.53 | 1.62 |
| 34 | Glass D-64 [h] at 410° C. | 42.48 | 26.51 | −66.72 | 0.74 |
| 35 | Glass E-64 [h] at 410° C. | 90.27 | −10.10 | −5.04 | 0.18 |
| 36 | Glass F-64 [h] at 410° C. | 61.63 | 42.12 | 16.12 | 3.34 |
| | Minimum | 39.87 | −18.83 | −69.53 | 0.15 |
| | Maximum | 90.40 | 42.75 | 34.53 | 8.41 |

For CIE Illuminant D65 and a 10° Observer, color difference, ΔE, ranges from about 0.15 to about 8.41 with the largest value being associated with Sample 24, a Au dopant substrates treated for 2 [h] at 450° C. while the smallest value is associated with Sample 29, a Cu dopant substrate treated for 32 [h] at 410° C.

TABLE VI

| | Hitachi U4001 Sample Thickness: 1 [mm] Scan Range: 200-2500 [nm] | CIE Illuminant F02-10° Observer | | | |
|---|---|---|---|---|---|
| Sample | Condition | L* | a* | b* | ΔE |
| A | Glass A-As Made | 84.71 | −5.51 | 2.93 | NA |
| B | Glass B-As Made | 89.89 | −1.41 | 15.45 | NA |
| C | Glass C-As Made | 78.25 | −15.37 | 37.61 | NA |
| D | Glass D-As Made | 39.10 | 17.12 | −75.71 | NA |
| E | Glass E-As Made | 89.72 | −7.16 | −6.09 | NA |
| F | Glass F-As Made | 65.40 | 30.51 | 17.76 | NA |
| 19 | Glass A-2 [h] at 450° C. | 83.73 | −5.52 | 3.04 | 0.99 |
| 20 | Glass B-2 [h] at 450° C. | 89.14 | −1.43 | 16.17 | 1.04 |
| 21 | Glass C-2 [h] at 450° C. | 76.53 | −15.37 | 37.64 | 1.72 |
| 22 | Glass D-2 [h] at 450° C. | 36.59 | 20.54 | −78.60 | 5.13 |
| 23 | Glass E-2 [h] at 450° C. | 89.62 | −6.97 | −5.66 | 0.48 |
| 24 | Glass F-2 [h] at 450° C. | 66.62 | 27.52 | 26.27 | 9.10 |
| 25 | Glass A-32 [h] at 410° C. | 84.74 | −5.18 | 1.86 | 1.12 |
| 26 | Glass B-32 [h] at 410° C. | 89.46 | −1.46 | 16.00 | 0.70 |
| 27 | Glass C-32 [h] at 410° C. | 77.12 | −14.99 | 36.67 | 1.52 |
| 28 | Glass D-32 [h] at 410° C. | 38.38 | 17.97 | −76.46 | 1.35 |
| 29 | Glass E-32 [h] at 410° C. | 89.62 | −7.10 | −6.03 | 0.13 |
| 30 | Glass F-32 [h] at 410° C. | 65.88 | 29.69 | 17.64 | 0.96 |
| 31 | Glass A-64 [h] at 410° C. | 83.61 | −5.74 | 2.53 | 1.20 |
| 32 | Glass B-64 [h] at 410° C. | 89.45 | −1.46 | 16.03 | 0.72 |
| 33 | Glass C-64 [h] at 410° C. | 76.79 | −15.24 | 38.23 | 1.59 |

TABLE VI-continued

| | Hitachi U4001<br>Sample Thickness: 1 [mm]<br>Scan Range: 200-2500 [nm] | CIE Illuminant F02-10° Observer | | | |
|---|---|---|---|---|---|
| Sample | Condition | L* | a* | b* | ΔE |
| 34 | Glass D-64 [h] at 410° C. | 39.33 | 16.68 | −75.37 | 0.60 |
| 35 | Glass E-64 [h] at 410° C. | 89.59 | −7.09 | −6.06 | 0.16 |
| 36 | Glass F-64 [h] at 410° C. | 64.97 | 29.62 | 21.27 | 3.64 |
| | Minimum | 36.59 | −15.37 | −78.60 | 0.13 |
| | Maximum | 89.89 | 30.51 | 38.23 | 9.10 |

For CIE Illuminant F02 and a 10° Observer, color difference, ΔE, ranges from about 0.13 to about 9.1 with the largest value being associated with Sample 24, a Au dopant substrates treated for 2 [h] at 450° C. while the smallest value is associated with Sample 29, a Cu dopant substrate treated for 32 [h] at 410° C.

TABLE VII

| | Hitachi U4001<br>Sample Thickness: 1 [mm]<br>Scan Range: 200-2500 [nm] | CIE Illuminant A-10° Observer | | | |
|---|---|---|---|---|---|
| Sample | Condition | L* | a* | b* | ΔE |
| A | Glass A-As Made | 84.07 | −8.04 | 0.55 | NA |
| B | Glass B-As Made | 89.96 | 1.30 | 13.78 | NA |
| C | Glass C-As Made | 76.61 | −16.72 | 32.70 | NA |
| D | Glass D-As Made | 36.63 | −9.41 | −72.01 | NA |
| E | Glass E-As Made | 88.84 | −12.28 | −7.98 | NA |
| F | Glass F-As Made | 68.17 | 40.24 | 24.23 | NA |
| 19 | Glass A-2 [h] at 450° C. | 83.08 | −8.02 | 0.64 | 0.99 |
| 20 | Glass B-2 [h] at 450° C. | 89.22 | 1.40 | 14.44 | 0.99 |
| 21 | Glass C-2 [h] at 450° C. | 74.93 | −16.55 | 32.68 | 1.68 |
| 22 | Glass D-2 [h] at 450° C. | 34.04 | −7.44 | −74.74 | 4.25 |
| 23 | Glass E-2 [h] at 450° C. | 88.77 | −11.88 | −7.52 | 0.61 |
| 24 | Glass F-2 [h] at 450° C. | 68.99 | 37.80 | 31.96 | 8.15 |
| 25 | Glass A-32 [h] at 410° C. | 84.12 | −7.76 | −0.32 | 0.92 |
| 26 | Glass B-32 [h] at 410° C. | 89.54 | 1.32 | 14.27 | 0.65 |
| 27 | Glass C-32 [h] at 410° C. | 75.57 | −16.11 | 31.84 | 1.48 |
| 28 | Glass D-32 [h] at 410° C. | 35.87 | −9.03 | −72.77 | 1.15 |
| 29 | Glass E-32 [h] at 410° C. | 88.76 | −12.15 | −7.89 | 0.18 |
| 30 | Glass F-32 [h] at 410° C. | 68.55 | 39.31 | 23.88 | 1.06 |
| 31 | Glass A-64 [h] at 410° C. | 82.93 | −8.47 | 0.11 | 1.29 |
| 32 | Glass B-64 [h] at 410° C. | 89.53 | 1.33 | 14.29 | 0.67 |
| 33 | Glass C-64 [h] at 410° C. | 75.14 | −16.52 | 33.31 | 1.60 |
| 34 | Glass D-64 [h] at 410° C. | 36.85 | −9.81 | −71.80 | 0.51 |
| 35 | Glass E-64 [h] at 410° C. | 88.73 | −12.14 | −7.92 | 0.20 |
| 36 | Glass F-64 [h] at 410° C. | 67.64 | 39.68 | 27.62 | 3.47 |
| | Minimum | 34.04 | −16.72 | −74.74 | 0.18 |
| | Maximum | 89.96 | 40.24 | 33.31 | 8.15 |

For CIE Illuminant D65 and a 10° Observer, color difference, ΔE, ranges from about 0.15 to about 8.41 with the largest value being associated with Sample 24, a Au dopant substrates treated for 2 [h] at 450° C. while the smallest value is associated with Sample 29, a Cu dopant substrate treated for 32 [h] at 410° C.

A second series of transmittance color measurements were made using a Hunterlab Ultrascan XE colorimeter configured with following measurement parameters: in the range of λ [nm] from 360-750, Spectral Bandwidth of 10 nm, Scan Steps of 10 nm, xenon flash lamp type source, diode array detector, and a ¾" diameter aperture. Sample preparation prior to making measurements was substantially as described above. Again, spectra for each sample were transformed into L*; a*; and b* CIELAB color space coordinates for CIE Illuminant D65 and a 10° Observer, as presented in Table VIII; for CIE Illuminant F02 and a 10° Observer, as presented in Table IX; and for CIE Illuminant A and a 10° Observer, as presented in Table X. Also, color difference: $\Delta E = [\{\Delta L^*\}^2 + \{\Delta a^*\}^2 + \{\Delta b^*\}^2]^{0.5}$ for each CIE Illuminant-Observer combination was determined. In addition, spectra for each of example glasses A-F were measured several times to establish measurement precision for colored glasses.

For CIE Illuminant D65 and a 10° Observer, color difference, ΔE, ranges from about 0.07 to about 6.5; however, ΔE of the measurement precision ranges from about 0.08 to about 0.21 suggesting that ΔE ranges from about 0.21 to about 6.5. Thus, the largest ΔE value is associated with Sample 34, a Co dopant substrates treated for 64 [h] at 410° C. while the smallest value is 0.26 associated with Sample 23, a Cu dopant substrate treated for 2 [h] at 410° C.

For CIE Illuminant F02 and a 10° Observer, color difference, ΔE, ranges from about 0.07 to about 6.33; however, ΔE of the measurement precision ranges from about 0.08 to about 0.21 suggesting that ΔE ranges from about 0.21 to about 6.33. Thus, the largest ΔE value is associated with Sample 34, a Co dopant substrates treated for 64 [h] at 410° C. while the smallest value is 0.29 associated with Sample 23, a Cu dopant substrate treated for 2 [h] at 410° C.

For CIE Illuminant A and a 10° Observer, color difference, ΔE, ranges from about 0.09 to about 5.2; however, ΔE of the measurement precision ranges from about 0.08 to about 0.17 suggesting that ΔE ranges from about 0.17 to about 5.2. Thus, the largest ΔE value is associated with Sample 34, a Co dopant substrates treated for 64 [h] at 410° C. while the smallest value is 0.17 associated with Sample 35, a Cu dopant substrate treated for 64 [h] at 410° C.

TABLE VIII

| | Hunterlab Ultrascan XE Sample Thickness: 1 [mm] Scan Range: 360-750 [nm] | CIE Illuminant D65-10° Observer | | | |
|---|---|---|---|---|---|
| Sample | Condition | L* | a* | b* | ΔE |
| A | Glass A-As Made | 85.23 | −7.68 | 1.30 | NA |
| B | Glass B-As Made | 89.17 | −1.77 | 13.70 | NA |
| C | Glass C-As Made | 76.02 | −19.65 | 33.34 | NA |
| D | Glass D-As Made-1$^{st}$ | 39.19 | 31.85 | −70.06 | NA |
| " | Glass D-As Made 2$^{nd}$ Measurement | 39.12 | 31.97 | −70.15 | 0.17 |
| " | Glass D-As Made 3$^{rd}$ Measurement | 39.24 | 31.83 | −70.08 | 0.20 |
| " | Glass D-As Made 4$^{th}$ Measurement | 39.16 | 31.85 | −70.06 | 0.08 |
| " | Glass D-As Made 5$^{th}$ Measurement | 39.15 | 32.01 | −70.20 | 0.21 |
| " | Minimum | 39.12 | 31.83 | −70.20 | 0.08 |
| " | Maximum | 39.24 | 32.01 | −70.06 | 0.21 |
| E | Glass E-As Made | 90.18 | −10.34 | −5.24 | NA |
| F | Glass F-As Made | 63.71 | 41.05 | 17.21 | NA |
| 19 | Glass A-2 [h] at 450° C. | 84.00 | −8.45 | 2.46 | 1.86 |
| 20 | Glass B-2 [h] at 450° C. | 88.56 | −1.80 | 14.40 | 0.93 |
| 21 | Glass C-2 [h] at 450° C. | 75.09 | −19.84 | 33.44 | 0.95 |
| 22 | Glass D-2 [h] at 450° C. | 39.43 | 31.41 | −69.85 | 0.54 |
| 23 | Glass E-2 [h] at 450° C. | 90.10 | −10.24 | −5.01 | 0.26 |
| 24 | Glass F-2 [h] at 450° C. | 63.79 | 39.26 | 22.17 | 5.27 |
| 25 | Glass A-32 [h] at 410° C. | 84.89 | −7.69 | 1.23 | 0.35 |
| 26 | Glass B-32 [h] at 410° C. | 88.90 | −1.84 | 14.23 | 0.60 |
| 27 | Glass C-32 [h] at 410° C. | 41.12 | 28.58 | −68.13 | 4.26 |
| 28 | Glass D-32 [h] at 410° C. | 75.53 | −19.27 | 32.54 | 1.01 |
| 29 | Glass E-32 [h] at 410° C. | 90.17 | −10.37 | −5.30 | 0.07 |
| 30 | Glass F-32 [h] at 410° C. | 63.67 | 41.07 | 13.83 | 3.38 |
| 31 | Glass A-64 [h] at 410° C. | 83.72 | −8.70 | 2.10 | 1.99 |
| 32 | Glass B-64 [h] at 410° C. | 88.88 | −1.85 | 14.25 | 0.63 |
| 33 | Glass C-64 [h] at 410° C. | 74.94 | −19.43 | 33.67 | 1.15 |
| 34 | Glass D-64 [h] at 410° C. | 42.11 | 26.88 | −67.06 | 6.50 |
| 35 | Glass E-64 [h] at 410° C. | 90.09 | −10.39 | −5.32 | 0.13 |
| 36 | Glass F-64 [h] at 410° C. | 62.14 | 42.04 | 17.30 | 1.86 |
| | Minimum | 39.19 | −19.84 | −70.06 | 0.07 |
| | Maximum | 90.18 | 42.04 | 33.67 | 6.50 |

TABLE IX

| | Hunterlab Ultrascan XE Sample Thickness: 1 [mm] Scan Range: 360-750 [nm] | CIE Illuminate F02-10° Observer | | | |
|---|---|---|---|---|---|
| Sample | Condition | L* | a* | b* | ΔE |
| A | Glass A-As Made | 85.06 | −5.24 | 1.53 | NA |
| B | Glass B-As Made | 89.80 | −1.53 | 15.50 | NA |
| C | Glass C-As Made | 77.42 | −16.11 | 36.69 | NA |
| D | Glass D-As Made-1$^{st}$ | 35.79 | 21.90 | −79.56 | NA |
| " | Glass D-As Made-2$^{nd}$ Measurement | 35.72 | 22.01 | −79.66 | 0.16 |
| " | Glass D-As Made-3$^{rd}$ Measurement | 35.84 | 21.88 | −79.59 | 0.19 |
| " | Glass D-As Made-4$^{th}$ Measurement | 35.77 | 21.91 | −79.56 | 0.08 |
| " | Glass D-As Made-5$^{th}$ Measurement | 35.75 | 22.04 | −79.73 | 0.21 |
| " | Minimum | 35.72 | 21.88 | −79.73 | 0.08 |
| " | Maximum | 35.84 | 22.04 | −79.56 | 0.21 |
| E | Glass E-As Made | 89.48 | −7.23 | −6.28 | NA |
| F | Glass F-As Made | 67.27 | 28.45 | 22.67 | NA |
| 19 | Glass A-2 [h] at 450° C. | 83.87 | −5.77 | 2.84 | 1.85 |
| 20 | Glass B-2 [h] at 450° C. | 89.22 | −1.58 | 16.29 | 0.98 |
| 21 | Glass C-2 [h] at 450° C. | 76.44 | −16.22 | 36.73 | 0.99 |
| 22 | Glass D-2 [h] at 450° C. | 36.03 | 21.55 | −79.32 | 0.49 |
| 23 | Glass E-2 [h] at 450° C. | 89.41 | −7.16 | −6.01 | 0.29 |

TABLE IX-continued

| | | | | | |
|---|---|---|---|---|---|
| 24 | Glass F-2 [h] at 450° C. | 67.45 | 26.91 | 27.85 | 5.41 |
| 25 | Glass A-32 [h] at 410° C. | 84.72 | −5.24 | 1.46 | 0.35 |
| 26 | Glass B-32 [h] at 410° C. | 89.56 | −1.60 | 16.10 | 0.65 |
| 27 | Glass C-32 [h] at 410° C. | 37.81 | 18.99 | −77.34 | 4.18 |
| 28 | Glass D-32 [h] at 410° C. | 76.85 | −15.74 | 35.74 | 1.17 |
| 29 | Glass E-32 [h] at 410° C. | 89.45 | −7.26 | −6.34 | 0.07 |
| 30 | Glass F-32 [h] at 410° C. | 66.88 | 29.06 | 18.78 | 3.96 |
| 31 | Glass A-64 [h] at 410° C. | 83.56 | −5.95 | 2.43 | 1.89 |
| 32 | Glass B-64 [h] at 410° C. | 89.54 | −1.61 | 16.13 | 0.69 |
| 33 | Glass C-64 [h] at 410° C. | 76.38 | −15.96 | 37.05 | 1.11 |
| 34 | Glass D-64 [h] at 410° C. | 38.83 | 17.54 | −76.12 | 6.33 |
| 35 | Glass E-64 [h] at 410° C. | 89.37 | −7.27 | −6.38 | 0.15 |
| 36 | Glass F-64 [h] at 410° C. | 65.61 | 29.35 | 22.61 | 1.89 |
| | Minimum | 35.79 | −16.22 | −79.56 | 0.07 |
| | Maximum | 89.80 | 29.35 | 37.05 | 6.33 |

| Hunterlab Ultrascan XE Sample Thickness: 1 [mm] Scan Range: 360-750 [nm] | | CIE Illuminant A-10° Observer | | | |
|---|---|---|---|---|---|
| Sample | Condition | L* | a* | b* | ΔE |
| A | Glass A-As Made | 84.42 | −7.93 | −0.67 | NA |
| B | Glass B-As Made | 89.88 | 1.22 | 13.77 | NA |
| C | Glass C-As Made | 75.82 | −17.43 | 31.84 | NA |
| D | Glass D-As Made-1$^{st}$ | 33.31 | −6.52 | −75.28 | NA |
| " | Glass D-As Made-2$^{nd}$ Measurement | 33.25 | −6.45 | −75.37 | 0.13 |
| " | Glass D-As Made-3$^{rd}$ Measurement | 33.36 | −6.55 | −75.31 | 0.16 |
| " | Glass D-As Made-4$^{th}$ Measurement | 33.29 | −6.52 | −75.28 | 0.08 |
| " | Glass D-As Made-5$^{th}$ Measurement | 33.27 | −6.45 | −75.43 | 0.17 |
| " | Minimum | 33.25 | −6.55 | −75.43 | 0.08 |
| " | Maximum | 33.36 | −6.45 | −75.28 | 0.17 |
| E | Glass E-As Made | 88.60 | −12.43 | −8.19 | NA |
| F | Glass F-As Made | 69.64 | 38.47 | 28.59 | NA |
| 19 | Glass A-2 [h] at 450° C. | 83.19 | −8.43 | 0.35 | 1.67 |
| 20 | Glass B-2 [h] at 450° C. | 89.30 | 1.31 | 14.48 | 0.92 |
| 21 | Glass C-2 [h] at 450° C. | 74.87 | −17.43 | 31.80 | 0.95 |
| 22 | Glass D-2 [h] at 450° C. | 33.56 | −6.77 | −75.08 | 0.41 |
| 23 | Glass E-2 [h] at 450° C. | 88.54 | −12.25 | −7.92 | 0.33 |
| 24 | Glass F-2 [h] at 450° C. | 69.73 | 37.31 | 33.39 | 4.94 |
| 25 | Glass A-32 [h] at 410° C. | 84.08 | −7.94 | −0.75 | 0.35 |
| 26 | Glass B-32 [h] at 410° C. | 89.64 | 1.24 | 14.30 | 0.58 |
| 27 | Glass C-32 [h] at 410° C. | 35.38 | −8.41 | −73.27 | 3.45 |
| 28 | Glass D-32 [h] at 410° C. | 75.33 | −16.88 | 30.97 | 1.14 |
| 29 | Glass E-32 [h] at 410° C. | 88.57 | −12.47 | −8.26 | 0.09 |
| 30 | Glass F-32 [h] at 410° C. | 69.44 | 38.73 | 24.83 | 3.77 |
| 31 | Glass A-64 [h] at 410° C. | 82.86 | −8.80 | −0.09 | 1.88 |
| 32 | Glass B-64 [h] at 410° C. | 89.61 | 1.23 | 14.32 | 0.61 |
| 33 | Glass C-64 [h] at 410° C. | 74.77 | −17.21 | 32.21 | 1.13 |
| 34 | Glass D-64 [h] at 410° C. | 36.44 | −9.29 | −72.19 | 5.20 |
| 35 | Glass E-64 [h] at 410° C. | 88.49 | −12.49 | −8.30 | 0.17 |
| 36 | Glass F-64 [h] at 410° C. | 68.20 | 39.53 | 28.89 | 1.81 |
| | Minimum | 33.31 | −17.43 | −75.28 | 0.09 |
| | Maximum | 89.88 | 39.53 | 33.39 | 5.20 |

Example Glass G

For Example glass G described in the following, 25 distinct batches were prepared with Si as sand, Al as alumina, Na as both soda ash and sodium nitrate, B as boric acid, and P as aluminum metaphosphate. Each of the 25 distinct batches of example glass G was formulated without metal containing dopants. Each of the 25 distinct batches was melted at 1600° C. for four hours and then poured and annealed between 550° C. and 650° C. The composition each example glass G corresponding one of the 25 distinct batches was analyzed by inductively coupled plasma and/or atomic absorption and/or X-ray fluorescence (XRF) techniques to determine the mol % of the constituent materials in each. The range of compositions of example glass G is reported in Table XI.

TABLE XI

Example Glass G Composition in Mo e Percent [ Mol % ]

| | $SiO_2$ | $Al_2O_3$ | $Na_2O$ | $K_2O$ | MgO | CaO | $SnO_2$ | $ZrO_2$ | $Fe_2O_3$ |
|---|---|---|---|---|---|---|---|---|---|
| Range | 68.0 | 7.0 | 12.0 | 0.1 | 5.0 | 0.0 | 0.1 | 0.0 | 0.0 |
| | 71.0 | 9.5 | 15.0 | 2.0 | 7.4 | 1.0 | 0.2 | 0.0 | 0.0 |

Samples 37-61

For each bath of example glass G, as-made substrates were communicated with a 5 wt % $AgNO_3$— 95 wt % $KNO_3$ bath at a temperature of about 410° C. for 8 [h] thereby producing Samples 37-61 and, for each, internal absorbance [%] for a 1 mm path length was determined from the difference of (1) an IOX sample's transmittance and reflectance sum and (2) the corresponding as-made sample's transmittance and reflectance sum.

Transmittance spectra for example glass G and Samples 37-61 were obtained using the commercially available a Hitachi U4001 spectrophotometer equipped with 60 mm diameter integrating sphere. The Hitachi U4001 spectrophotometer was configured with following measurement parameters: in the range of λ [nm] from 200-800, the settings were Scan Speed: 120 nm/min and Bandwidth—PMT—3.0 nm and, with a detector change at 800 nm, in the range of λ [nm] from 800-2500, the settings were Scan Speed: 300 nm/min and Bandwidth—PbS—Servo, Gain—4 while in the range of λ [nm] from 200-340, the source was deuterium based and, with a source change at 340 nm, in the range of λ [nm] from 340-2500, the source was tungsten halogen based. No aperture was used over the entire range of λ [nm] from 200-2500 nm. The surfaces of each sample was polished to an optical finish. Prior to measurement, the flats of each sample were cleaned using a first low linting wiper saturated with a solution of 1% micro soap concentrate in deionized (DI) water; rinsed using DI water; dried using a second linting wiper; and finally wiped using a third wiper dampened with HPLC grade reagent alcohol.

Reflectance spectra for example glass G and Samples 37-61 were obtained using the commercially available a Perkin Elmer Lamda 950 spectrophotometer with a 60 mm diameter integrating sphere. The Perkin Elmer Lamda 950 spectrophotometer was configured with following measurement parameters: in the range of λ [nm] from 200-860, the settings were Scan Speed: 480 nm/min and Bandwidth—PMT—3.0 nm and, with a detector change at 860 nm, in the range of λ [nm] from 860-2500, the settings were Scan Speed: 480 nm/min and Bandwidth—PbS—Servo, Gain—5 while in the range of λ [nm] from 200-340, the source was deuterium based and, with a source change at 340 nm, in the range of λ [nm] from 340-2500, the source was tungsten halogen based. No aperture was used over the entire range of λ [nm] from 200-2500 nm. The surfaces of each sample was polished to an optical finish. Prior to measurement, the flats of each sample were cleaned using a first low linting wiper saturated with a solution of 1% micro soap concentrate in deionized (DI) water; rinsed using DI water; dried using a second linting wiper; and finally wiped using a third wiper dampened with HPLC grade reagent alcohol.

Figure 11:
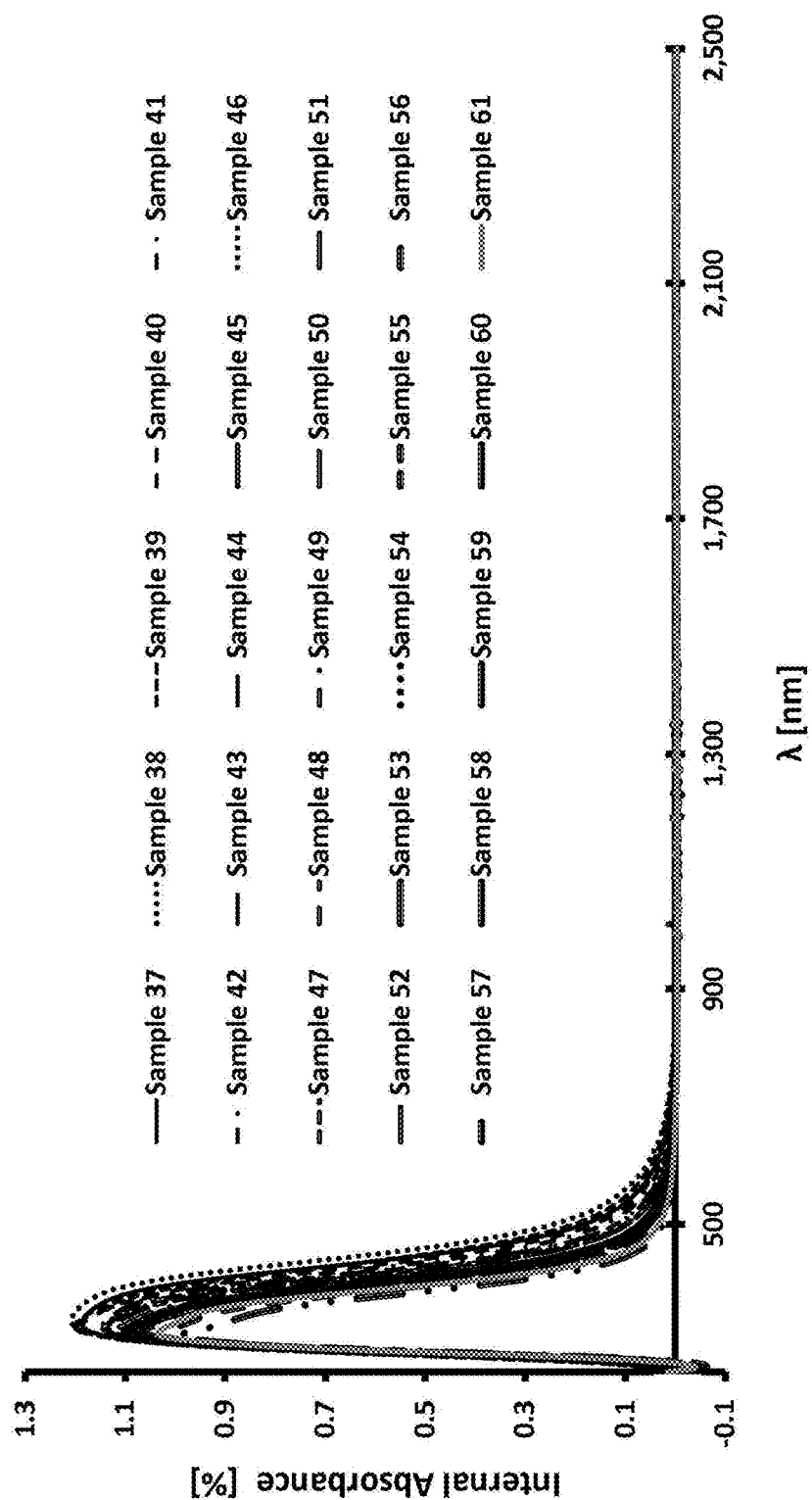
FIG. 11 shows the internal absorbance [%] for a 1 mm path length as a function of wavelength, λ [nm], for substrates of IOX glass compositions (i.e., Samples 37-61 made using ion exchangeable clear Glass G) colored using a silver (Ag) dopant by IOX at 410° C. for 8 [h] using a 5 wt % $AgNO_3$— 95 wt % $KNO_3$ bath according to aspects of embodiments and/or embodiments of this disclosure.
Figure 12:
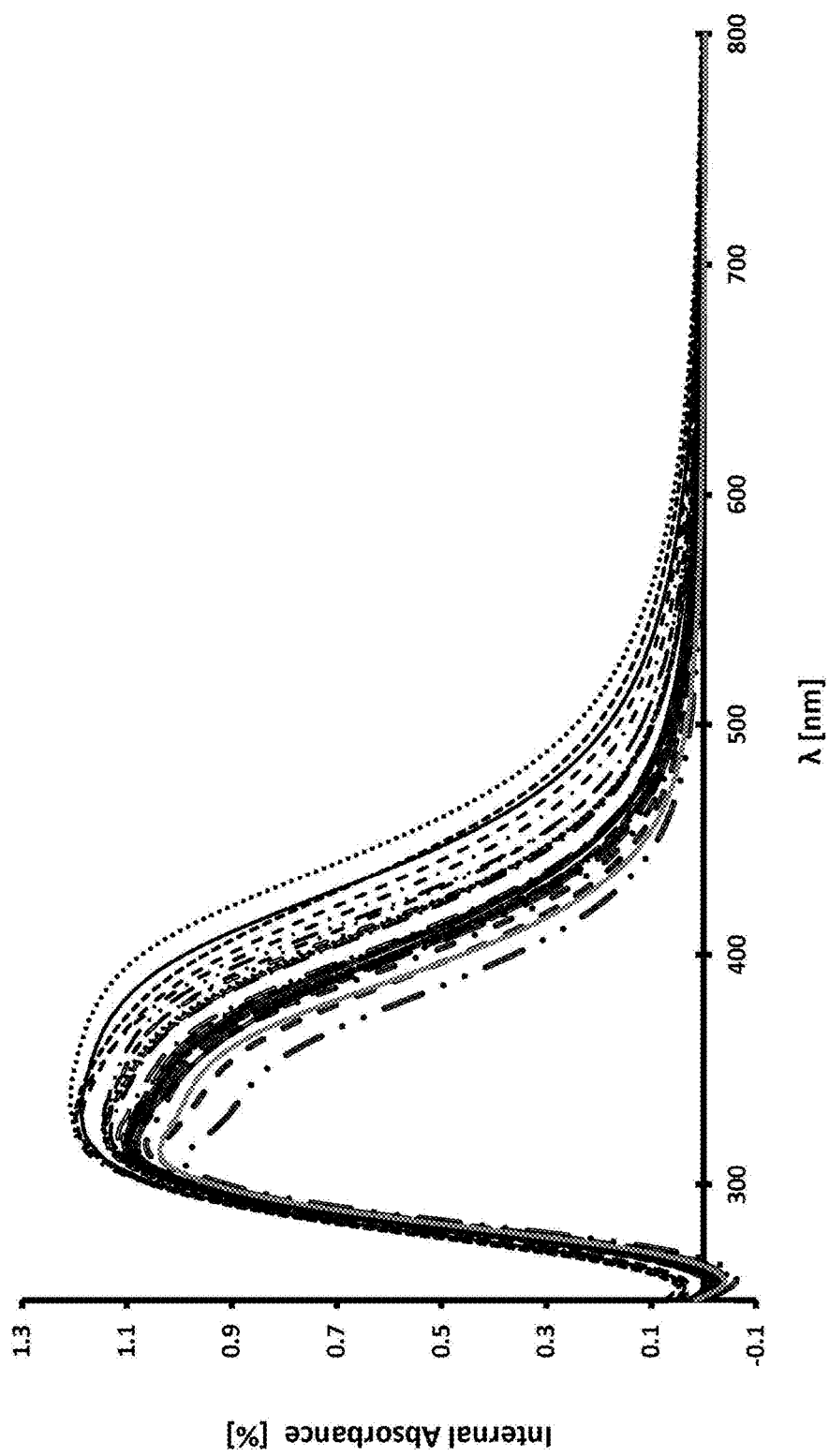
FIG. 12 shows a detail of the internal absorbance [%] for a 1 mm path length as a function of wavelength, λ [nm], of FIG. 11 for substrates of IOX glass compositions (i.e., Samples 37-61 made using ion exchangeable clear Glass G) colored using a silver (Ag) dopant by IOX at 410° C. for 8 [h] using a 5 wt % $AgNO_3$— 95 wt % $KNO_3$ bath according to aspects of embodiments and/or embodiments of this disclosure.

Table XII summarizes average, minimum, and maximum internal absorbance [%] for 1 mm path length for Samples 37-61 while FIG. 11 graphically depicts the internal absorbance [%] for 1 mm path length over the entire range of λ [nm] from about 250-2500 for Samples 37-61 and FIG. 12 graphically depicts the internal absorbance [%] for 1 mm path length over the entire range of λ [nm] from about 250-800 for Samples 37-61.

TABLE XII

Samples 37-61 Treated for 8 [h] at 410° C.
Using a 5 wt % AgNO3-95 wt % KNO3 Bath

| | Internal Absorbance [%] for 1 mm path length | | |
|---|---|---|---|
| λ [nm] | Average | Minimum | Maximum |
| 250 | 0.03 | 0.00 | 0.07 |
| 262 | 0.02 | −0.06 | 0.11 |
| 274 | 0.26 | 0.13 | 0.41 |
| 286 | 0.67 | 0.56 | 0.79 |
| 300 | 0.99 | 0.91 | 1.06 |
| 312 | 1.10 | 0.99 | 1.17 |
| 324 | 1.11 | 0.93 | 1.20 |
| 336 | 1.09 | 0.89 | 1.21 |
| 350 | 1.05 | 0.83 | 1.20 |
| 362 | 1.00 | 0.75 | 1.19 |
| 374 | 0.93 | 0.63 | 1.17 |
| 386 | 0.83 | 0.50 | 1.13 |
| 400 | 0.69 | 0.36 | 1.07 |
| 412 | 0.57 | 0.26 | 0.98 |
| 424 | 0.45 | 0.19 | 0.87 |
| 436 | 0.35 | 0.13 | 0.74 |
| 450 | 0.26 | 0.09 | 0.59 |
| 462 | 0.20 | 0.06 | 0.48 |
| 474 | 0.16 | 0.05 | 0.39 |
| 486 | 0.12 | 0.03 | 0.31 |
| 500 | 0.09 | 0.03 | 0.24 |
| 512 | 0.08 | 0.02 | 0.20 |
| 524 | 0.06 | 0.02 | 0.17 |
| 536 | 0.05 | 0.01 | 0.14 |
| 550 | 0.04 | 0.01 | 0.11 |
| 562 | 0.03 | 0.01 | 0.10 |
| 574 | 0.03 | 0.01 | 0.08 |
| 586 | 0.02 | 0.00 | 0.07 |
| 600 | 0.02 | 0.00 | 0.06 |
| 612 | 0.02 | 0.00 | 0.05 |
| 624 | 0.01 | 0.00 | 0.04 |
| 636 | 0.01 | 0.00 | 0.04 |
| 650 | 0.01 | 0.00 | 0.03 |
| 662 | 0.01 | 0.00 | 0.03 |
| 674 | 0.01 | 0.00 | 0.02 |
| 686 | 0.01 | 0.00 | 0.02 |
| 700 | 0.00 | 0.00 | 0.02 |
| 712 | 0.00 | 0.00 | 0.01 |
| 724 | 0.00 | 0.00 | 0.01 |
| 736 | 0.00 | 0.00 | 0.01 |
| 750 | 0.00 | 0.00 | 0.01 |
| 762 | 0.00 | 0.00 | 0.01 |
| 774 | 0.00 | 0.00 | 0.01 |
| 786 | 0.00 | 0.00 | 0.00 |
| 800 | 0.00 | 0.00 | 0.00 |

The invention claimed is:

1. A colored glass underside or backplate for personal electronic devices, including mobile or smart phones, comprising:
   50 to 65 mol % $SiO_2$;
   10 to 20 mol % $Al_2O_3$;
   1 to 10 mol % $B_2O_3$;
   0 to 8.5 mol % MgO;
   0 to 2 mol % ZnO;
   0 to 10 mol % $P_2O_5$;
   alkali metal oxides ($R_2O$), wherein R is selected from the group consisting of Na and K; and
   wherein [$R_2O+Al_2O_3+MgO+ZnO$] is greater than or equal to 29.46 mol % and less than or equal to 32.28 mol %; and
   colorant dopant(s) comprising non-zero amounts of $Co_3O_4$ and $Fe_2O_3$, up to 0.70 mol % $Fe_2O_3$.

2. The colored glass underside or backplate of claim 1, comprising up to 5 mol % of the colorant dopants.

3. The colored glass underside or backplate of claim 1, wherein the glass is ion-exchange strengthened, having a compressive stress of at least 500 MPa and a depth of layer of at least 15 μm.

4. The colored glass underside or backplate of claim 1, wherein the colorant dopant(s) further comprise Cu.

5. The colored glass underside or backplate of claim 1, wherein the colorant dopant(s) further comprise Cr.

6. The colored glass underside or backplate of claim 1, comprising at least 0.01 mol % of $Fe_2O_3$.

7. A colored glass underside or backplate for personal electronic devices, including mobile or smart phones, comprising:

50 to 65 mol % $SiO_2$;
10 to 20 mol % $Al_2O_3$;
1 to 10 mol % $B_2O_3$;
0 to 8.5 mol % MgO;
0 to 2 mol % ZnO;
0 to 10 mol % $P_2O_5$;
alkali metal oxides ($R_2O$), wherein R is selected from the group consisting of Na and K; and
wherein [$R_2O+Al_2O_3+MgO+ZnO$] is greater than or equal to 29.46 mol % and less than or equal to 32.28 mol %; and
colorant dopant(s) comprising non-zero amounts of Co, Fe, and Cu, up to 0.70 mol % $Fe_2O_3$.

8. The colored glass underside or backplate of claim 7, comprising up to 5 mol % of the colorant dopants.

9. The colored glass underside or backplate of claim 8, comprising no more than 0.1 mol % $Co_3O_4$.

10. The colored glass underside or backplate of claim 7, wherein the glass is ion-exchange strengthened, having a compressive stress of at least 500 MPa and a depth of layer of at least 15 μm.

11. The colored glass underside or backplate of claim 7, comprising no more than 0.9 mol % of CuO.

12. A colored glass underside or backplate for personal electronic devices, including mobile or smart phones, comprising:
50 to 65 mol % $SiO_2$;
10 to 20 mol % $Al_2O_3$;
1 to 10 mol % $B_2O_3$;
0 to 8.5 mol % MgO;
0 to 2 mol % ZnO;
0 to 10 mol % $P_2O_5$;
alkali metal oxides ($R_2O$), wherein R is selected from the group consisting of Na and K; and
wherein [$R_2O+Al_2O_3+MgO+ZnO$] is greater than or equal to 29.46 mol % and less than or equal to 32.28 mol %; and
colorant dopant(s) comprising a non-zero amount of $Co_3O_4$ and no more than 0.1 mol % $Co_3O_4$,
wherein the colored glass underside or backplate has a color comprising one or more hues selected from shades of red, orange, yellow, green, blue, and violet.

13. The colored glass underside or backplate of claim 12, comprising up to 5 mol % of the colorant dopants.

14. The colored glass underside or backplate of claim 12, further comprising Fe.

* * * * *